(12) United States Patent
Lewis et al.

(10) Patent No.: US 11,106,712 B2
(45) Date of Patent: Aug. 31, 2021

(54) SYSTEMS AND METHODS FOR MEASURING THE SEMANTIC RELEVANCE OF KEYWORDS

(71) Applicant: GOOGLE LLC, Mountain View, CA (US)

(72) Inventors: Justin Lewis, Mountain View, CA (US); Gavin James, Mountain View, CA (US)

(73) Assignee: Google LLC, Mountain View, CA (US)

( * ) Notice: Subject to any disclaimer, the term of this patent is extended or adjusted under 35 U.S.C. 154(b) by 745 days.

(21) Appl. No.: 15/332,551

(22) Filed: Oct. 24, 2016

(65) Prior Publication Data

US 2018/0113933 A1    Apr. 26, 2018

(51) Int. Cl.
| | | |
|---|---|---|
| *G06F 16/33* | (2019.01) | |
| *G06F 16/35* | (2019.01) | |
| *G06F 16/901* | (2019.01) | |
| *G06F 16/36* | (2019.01) | |
| *G06F 16/242* | (2019.01) | |
| *G06F 40/205* | (2020.01) | |

(52) U.S. Cl.
CPC ........ *G06F 16/3344* (2019.01); *G06F 16/243* (2019.01); *G06F 16/355* (2019.01); *G06F 16/367* (2019.01); *G06F 16/9024* (2019.01); *G06F 40/205* (2020.01)

(58) Field of Classification Search
CPC .... G06F 17/30707; G06F 17/27; G06F 16/31; G06F 16/367; G06Q 30/00
See application file for complete search history.

(56) References Cited

U.S. PATENT DOCUMENTS 5,371,807 A * 12/1994 Register ................ G06F 16/353
382/159
6,138,116 A * 10/2000 Kitagawa ............ G06F 16/3332
707/752

(Continued)

OTHER PUBLICATIONS

Shieh (Relational Term-Suggestion Graphs Incorporating Multipartite Concept and Expertise Networks, ACM Transactions on Intelligent Systems and Technology, Jan. 2014) (Year: 2014).*

(Continued)

*Primary Examiner* — Apu M Mofiz
*Assistant Examiner* — Farhad Agharahimi
(74) *Attorney, Agent, or Firm* — Foley & Lardner LLP

(57) ABSTRACT

A server can receive a seed keyword to generate additional keywords relevant to the seed keyword. The server can identify, using a semantic relationship graph, keyword categories. Each keyword can have a semantic distance from the seed keyword less than a threshold. The server can generate, for each keyword of the keyword categories, a keyword-seed affinity score based on a frequency of the keyword occurring with the seed keyword on an information resource. The server can determine, for each keyword category, a category-seed affinity score based on the keyword-seed affinity scores for each of keyword in the keyword category. The server can compare each category-seed affinity score a threshold. The server can transmit, for display, the keywords. One keyword category can be indicated as selected and another keyword category can be indicated as unselected based on the comparison.

17 Claims, 11 Drawing Sheets

(56) References Cited

U.S. PATENT DOCUMENTS

| | | | |
|---|---|---|---|
| 2002/0092031 A1* | 7/2002 | Dudkiewicz | H04N 21/4854 725/138 |
| 2005/0228797 A1 | 10/2005 | Koningstein et al. | |
| 2007/0220040 A1 | 9/2007 | Do | |
| 2008/0104060 A1* | 5/2008 | Abhyankar | G06F 16/3323 |
| 2010/0185661 A1 | 7/2010 | Malden et al. | |
| 2010/0185689 A1* | 7/2010 | Hu | G06F 40/289 707/803 |
| 2011/0125764 A1 | 5/2011 | Carmel et al. | |
| 2012/0016906 A1 | 1/2012 | Tang et al. | |
| 2014/0149106 A1* | 5/2014 | Beretta | G06F 40/232 704/9 |
| 2015/0095319 A1* | 4/2015 | Ormont | G06F 16/3338 707/723 |
| 2015/0227620 A1* | 8/2015 | Takeuchi | G06F 16/48 707/740 |
| 2016/0203130 A1* | 7/2016 | Roque | G06F 16/93 707/741 |

OTHER PUBLICATIONS

Augenstein Isabelle et al: $201CMapping Keywords to Linked Data Resources for Automatic Query Expansion$201D, May 26, 2013 (May 26, 2013), Network and Parallel Computing; [Lecuture Nots in Computer Science; Lect. Notes Computer], Springer International Publishing, Cham, pp. 101-112, XP047041510, ISSN: 0302-9743;ISBN: 978-3-540-28012-5 Sections 3, 3.2.

International Search Report and The Written Opinion of the International Searching Authority for application No. PCT/US2017/057919 dated Jan. 3, 2018.

Notice of Reasons for Rejection for JP Appln. Ser. No. 2019-508213 dated Apr. 6, 2020 (5 pages).

International Preliminary Report on Patentability for PCT Appln. Ser. No. PCT/US2017/057919 dated Nov. 9, 2018 (7 pages).

Office Action on EP Appln. Ser. No, 17795137.3 dated Nov. 13, 2019 (9 pages).

Augenstein et al., "Mapping Keywords to Linked Data Resources for Automatic Query Expansion", The Semantic Web: ESWC 2013 Satellite Events, ESWC 2013, Lecture Notes in Computer Science, vol. 7955, pp. 101-112, 2013, available at URL: https://doi.org/10.1007/978-3-642-41242-4_9 (12 pages).

Examination Report for IN Appln. Ser. No. 201947005653 dated Dec. 29, 2020 (8 pages).

Office Action for KR Appln. Ser. No. 10-2019-7006517 dated Apr. 29, 2020 (14 pages).

* cited by examiner

Information Resource 400

Interface 405

Seed Keyword: Spatula 410A

| Selected Keyword Categories 415A | Unselected Keyword Categories 415B |
|---|---|
| ☑ Material Category 420A | ☐ Discipline Category 420D |
| ☑ Rubber 425A | ☐ Science 430A |
| ☑ Glass 425B | ☐ Chemistry 430B |
| ☐ Ceramic 425C | ☐ English 430C |
| ☑ Steel 425D | ☐ Art 430D |
| ☑ Wooden 425E | ☐ Culinary 430E |
| ☑ Component Category 420B | ☐ History 430F |
| ☑ Handle 425F | ☐ Service Category 420E |
| ☑ Blade 425G | ☐ Laboratory 430G |
| ☑ Color Category 420C | ☐ Pharmacy 430H |
| ☑ Stainless 425H | ☐ Factory 430I |
| ☑ Black 425I | |

Checkbox 435A — Material Category 420A
Checkbox 435B — Ceramic 425C
Checkbox 435C — Factory 430I

FIG. 5

SYSTEMS AND METHODS FOR MEASURING THE SEMANTIC RELEVANCE OF KEYWORDS

BACKGROUND

In a computer networked environment such as the internet, content providers provide content for display on end-user computing devices. The content typically takes the form of one or more portions that may displayed. For example, typically portions of content are provided by way of one or more web pages, with each portion of content being provided as a web page.

SUMMARY

At least one aspect is directed to a method of measuring semantic relevance of keywords by parsing information resources. A data processing system having one or more processors can receive, from a content provider computing device corresponding to a domain entity, a seed keyword to generate additional keywords relevant to the seed keyword. The data processing system can identify, using a semantic relationship graph, a plurality of keyword categories including a first keyword category and a second keyword category. Each of the plurality of keyword categories can include a plurality of keywords. Each of the plurality of keywords can have a semantic distance from the seed keyword less than a semantic distance threshold. The data processing system can generate, for each keyword of the first keyword category and the second keyword category, a keyword-seed affinity score based on a frequency of the keyword occurring with the seed keyword on an information resource of the domain entity. The data processing system can determine, for the first keyword category, a first category-seed affinity score based on the keyword-seed affinity scores for each of the plurality of keywords in the first keyword category. The data processing system can determine, for the second keyword category, a second category-seed affinity score based on the keyword-seed affinity scores for each of the plurality of keywords in the second keyword category. The data processing system can compare each of the first category-seed affinity score and the second category-seed affinity score to an affinity score threshold. The data processing system can determine that the first category-seed affinity score is greater than the affinity score threshold and that the second category-seed affinity score is less than the affinity score threshold. The data processing system can transmit, to a content provider computing device for display, the plurality of keywords. The first keyword category can be indicated as selected and the second keyword category can be indicated as unselected responsive to determining that the first category-seed affinity score is greater than the affinity score threshold and the second category-seed affinity score is less than the affinity score threshold.

In some implementations, the data processing system can identify, using the semantic relationship graph, a semantic conflict between the first keyword category and the second keyword category. In some implementations, the data processing system can compare the first category-seed affinity score to the second category-affinity score, responsive to identifying the semantic conflict between the first keyword category and the second keyword category. In some implementations, the data processing system can transmit the plurality of keywords. The first keyword category can be indicated as selected and the second keyword category can be indicated as unselected, responsive to determining that the first category-seed affinity score is greater than the second category-seed affinity score.

In some implementations, the data processing system can identify, using the semantic relationship graph, a semantic conflict among the first keyword category, and the second keyword category, and a third keyword category. In some implementations, the data processing system can determine, based on the semantic conflict, a first category group and a second category group, the first category group including the first keyword category, the second category group including the second keyword category and the third keyword category. In some implementations, the data processing system can determine a first group-seed affinity score for the first category group and a second group-seed affinity score for the second category group. In some implementations, the data processing system can compare the first group-seed affinity score to the second group-seed affinity score. In some implementations, the data processing system can transmit the plurality of keywords. The first keyword category can be indicated as selected and the second keyword category and the third keyword category can be indicated as unselected, responsive to determining that the first group-seed affinity score is greater than the second group-seed affinity score.

In some implementations, the data processing system can compare, for each keyword of the first keyword category and the second keyword category, the keyword-seed affinity score to a second affinity score threshold. In some implementations, the data processing system can identify, for each of the first keyword category and of the second keyword category, a subset of keywords each having the keyword-seed affinity score less than the second affinity score threshold. In some implementations, the data processing system can transmit the plurality of keywords. The subset of keywords in the first keyword category or the second keyword category can be indicated as unselected responsive to identifying the subset of keywords each having the keyword-seed affinity score less than the second affinity score threshold.

In some implementations, the data processing system can calculate a first combination score based on the keyword-seed affinity scores for each of the plurality of keywords in the first keyword category. In some implementations, the data processing system can calculate a second combination score based on the keyword-seed affinity scores for each of the plurality of keywords in the second keyword category.

In some implementations, the data processing system can parse the information resource to identify one or more terms of the information resource and a placement of each of the one or more terms on the information resource. In some implementations, the data processing system can determine, using the semantic relationship graph, for at least one keyword of the first keyword category and the second keyword category, a first semantic match between at least one of the one or more terms of the information resource and the respective keyword. In some implementations, the data processing system can determine, using the semantic relationship graph, a second semantic match between at least one of the one or more terms of the information resource and the seed keyword. In some implementations, the data processing system can calculate the keyword-seed affinity score based on the placement of the corresponding keyword on the information resource, responsive to determining the first semantic match and to determining the second semantic match.

In some implementations, the data processing system can identify a hierarchical depth of the information resource. In some implementations, the data processing system can adjust, for each of the keyword-seed affinity scores of the first keyword category and the second keyword category, the keyword-seed affinity score by a preset weight based on the hierarchical depth identified for the information resource.

In some implementations, the data processing system can identify, for each keyword of the first keyword category and the second keyword category, a normalization factor indicating average frequency of the keyword across a plurality of information resources. In some implementations, the data processing system can adjust, for each of the keyword-seed affinity scores of the first keyword category and the second keyword category, the keyword-seed affinity score by the normalization factor.

In some implementations, the data processing system can identify, using the semantic relationship graph, from the plurality of keywords, a first topical keyword representative of the first keyword category and a second topical keyword representative of the second keyword category. The first topical keyword can have a first minimum semantic distance from each of the plurality of keywords in the first keyword category less than the semantic distance threshold. The second topical keyword can have a second minimum semantic distance from each of the plurality of keywords in the second keyword category less than the semantic distance threshold. In some implementations, the data processing system can transmit the plurality of keywords. The plurality of keywords can be categorized into the first keyword category with the first topical keyword and the second keyword category and with the second topical keyword, responsive to identifying the first topical keyword and the second topical keyword.

In some implementations, the data processing system can transmit a script. The script can trigger the content provider computing device to display a keyword selection interface. The keyword selection interface can include a first content element indicating each of the plurality of keywords of the first keyword category as selected and a second content element indicating each of the plurality of keywords of the second keyword category as unselected.

At least one aspect is directed to a system for measuring semantic relevance of keywords by parsing information resources. The system can include a keyword generator module executed on a data processing system having one or more processors. The keyword generator module can receive, from a content provider computing device corresponding to a domain entity, a seed keyword to generate additional keywords relevant to the seed keyword. The keyword generator module can identify, using a semantic relationship graph, a plurality of keyword categories including a first keyword category and a second keyword category. Each of the plurality of keyword categories can include a plurality of keywords. Each of the plurality of keywords can have a semantic distance from the seed keyword less than a semantic distance threshold. The system can include a frequency calculator module executed on the data processing system. The frequency calculator module can determine, for each keyword of the first keyword category and the second keyword category, a keyword-seed affinity score based on a frequency of the keyword occurring with the seed keyword on an information resource of the domain entity. The frequency calculator module can determine, for the first keyword category, a first category-seed affinity score based on the keyword-seed affinity scores for each of the plurality of keywords in the first keyword category. The frequency calculator module can determine, for the second keyword category, a second category-seed affinity score based on the keyword-seed affinity scores for each of the plurality of keywords in the second keyword category. The system can include a keyword selector module executed on the data processing system. The keyword selector module can compare each of the first category-seed affinity score and the second category-seed affinity score to an affinity score threshold. The keyword selector module can determine that the first category-seed affinity score is greater than the affinity score threshold and that the second category-seed affinity score is less than the affinity score threshold. The system can include an interface provider module executed on the data processing system. The interface provider module can configured to transmit, to a content provider computing device for display, the plurality of keywords. The first keyword category can be indicated as selected and the second keyword category can be indicated as unselected responsive to determining that the first category-seed affinity score is greater than the affinity score threshold and the second category-seed affinity score is less than the affinity score threshold.

In some implementations, the keyword selector module can identify using the semantic relationship graph, a semantic conflict between the first keyword category and the second keyword category. In some implementations, the frequency calculator module can compare the first category-seed affinity score to the second category-affinity score, responsive to identifying the semantic conflict between the first keyword category and the second keyword category. In some implementations, the interface provider module can transmit the plurality of keywords. The first keyword category can be indicated as selected and the second keyword category can be indicated as unselected, responsive to a determination that the first category-seed affinity score is greater than the second category-seed affinity score.

In some implementations, the keyword selector module can compare, for each keyword of the first keyword category and the keyword-seed affinity score to a second affinity score the second keyword category, threshold. In some implementations, the keyword selector module can identify, for each of the first keyword category and of the second keyword category, a subset of keywords each having the keyword-seed affinity score less than the second affinity score threshold. In some implementations, the interface provider module can transmit the plurality of keywords. The subset of keywords in the first keyword category or the second keyword category can be indicated as unselected responsive to identifying the subset of keywords each having the keyword-seed affinity score less than the second affinity score threshold.

In some implementations, the system can include a resource parser module executed on the data processing system. In some implementations, the resource parser module can parse the information resource to identify one or more terms of the information resource and a placement of each of the one or more terms on the information resource. In some implementations, the resource parser module can determine, using the semantic relationship graph, for at least one keyword of the first keyword category and the second keyword category, a first semantic match between at least one of the one or more terms of the information resource and the respective keyword. In some implementations, the resource parser module can determine, using the semantic relationship graph, for at least one keyword of the first keyword category and the second keyword category, a second semantic match between at least one of the one or more terms of the information resource and the seed keyword. In some implementations, the frequency calculator module can calculate the keyword-seed affinity score based on the placement of the corresponding keyword on the information resource, responsive to determining the first semantic match and to determining the second semantic match.

In some implementations, the system can include a resource parser module executed on the data processing system. In some implementations, the resource parser module can identify a hierarchical depth of the information resource. In some implementations, the frequency calculator module can adjust, for each of the keyword-seed affinity scores of the first keyword category and the second keyword category, the keyword-seed affinity score by a preset weight based on the hierarchical depth identified for the information resource.

In some implementations, the frequency calculator module can identify, for each keyword of the first keyword category and the second keyword category, a normalization factor indicating average frequency of the keyword across a plurality of information resources. In some implementations, the frequency calculator module can adjust, for each of the keyword-seed affinity scores of the first keyword category and the second keyword category, the keyword-seed affinity score by the normalization factor At least one aspect is directed to a method of measuring semantic relevance of keywords by parsing information resources. A data processing system having one or more processors can receive, from a content provider computing device corresponding to a domain entity, a seed keyword to generate additional keywords semantically relevant to the seed keyword. The data processing system can access, from a database, a semantic relationship graph including a plurality of nodes representing keywords and a plurality of edges. Each of the plurality of edges can connect two respective nodes of the plurality of nodes and can define a semantic distance between the two keywords representing the two respective nodes. The data processing system can traverse the plurality of nodes of the semantic relationship graph to identify a seed node representing the seed keyword and for each of the candidate nodes adjacent to the seed node a semantic distance between the seed keyword and the keyword of the adjacent node. The data processing system can identify a set of candidate nodes from the plurality of nodes adjacent to the seed node having a respective edge with a respective semantic distance between a seed node-candidate node pair of less than a semantic distance threshold. The data processing system can identify a plurality of information resources of the domain entity. The data processing system can parse, for each candidate keyword of the set of candidate nodes, the plurality of information resources to determine a frequency at which the seed keyword and the candidate keyword occur in the plurality of the information resources. The data processing system can identify, from the candidate keywords of the set of candidate nodes, a first set of keywords and a second set of keywords. Each of the first set of keywords can have a respective frequency greater than or equal to a frequency threshold. Each of the second set of keywords can have a respective frequency less than the frequency threshold. The data processing system can transmit, to the content provider computing device, instructions to display at the content provider computing device, the first set of keywords as selected as relevant and the second set of keywords as unselected as irrelevant based on the corresponding frequencies and the frequency threshold.

In some implementations, the data processing system can compute, for each candidate keyword of the set of candidate keyword, a normalization factor based on a frequency at which the respective keyword occurs in a general corpus different from the plurality of information resources. In some implementations, the data processing system can adjust for each candidate keyword of the set of candidate keyword, the frequency by the normalization factor for the respective keyword.

In some implementations, the data processing system can access the semantic relationship. Each of the plurality of edges can define the two respective nodes as semantically conflicting. In some implementations, the data processing system can identify, using the semantic relationship graph, a semantic conflict between the keywords of the set of candidate keywords based on the respective edge indicating two corresponding keywords as semantically conflicting. In some implementations, the data processing system can compare a first frequency of a first keyword of the set of candidate keywords to a second frequency of a second keyword of the set of candidate keywords, responsive to identifying the semantic conflict.

In some implementations, the data processing system can identify, for each keyword of the set of candidate nodes, using a clustering algorithm, one of a first keyword category and a second keyword category based on the semantic distances among each keyword of the set of candidate nodes. In some implementations, the data processing system can identify the first keyword category as selected and the second keyword category as unselected based on the corresponding frequency of each keyword and the frequency threshold.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 5 is another block diagram of an information resource with an interface showing keywords and keyword categories generated from the seed keyword designated as selected or unselected, according to an illustrative implementation;

DETAILED DESCRIPTION

Figure 1:
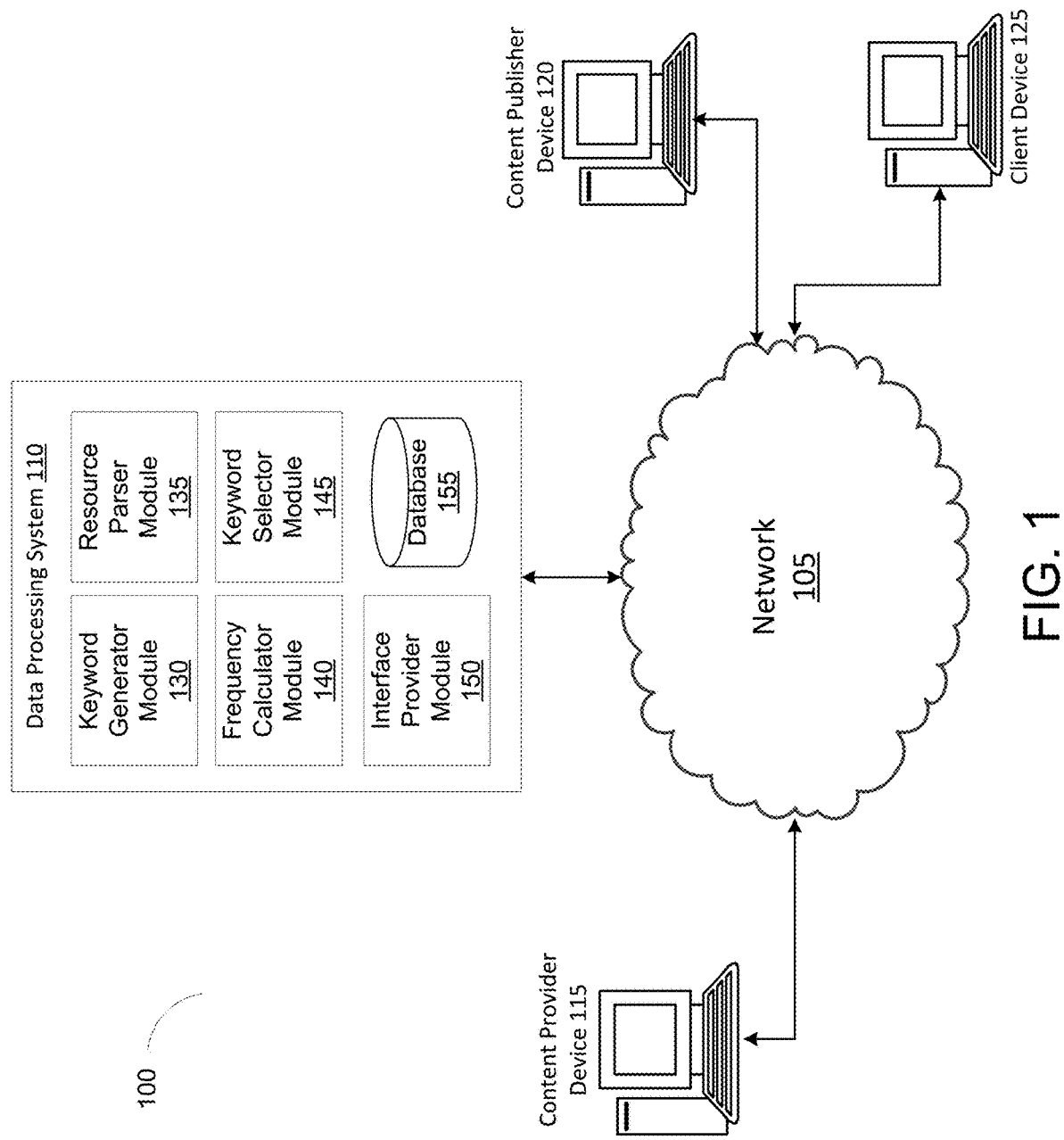
FIG. 1 is a block diagram depicting one implementation of an environment for measuring the semantic relevance of keywords in a computer network environment, according to an illustrative implementation.

Following below are more detailed descriptions of various concepts related to, and implementations of, methods, apparatuses, and systems of accurately and efficiently discovering keywords using a seed keyword by measuring the semantic relevance of keywords across multiple information resources in a computer network environment. The various concepts introduced above and discussed in greater detail below may be implemented in any of numerous ways, as the described concepts are not limited to any particular manner of implementation.

In computer networked environments, servers can provide and select content items for display with information resources based on keywords in a search query submitted via a search page by a client device. Through the use of content selection management platforms, content providers can designate which of these keywords may be used in the selection of these content items of the content provider. Content providers can also provide a seed keyword to such content selection management platforms to generate and/or discover additional related keywords. These related keywords can be generated and/or discovered using a semantic relationship graph. The semantic relationship graph can specify to what degree each keyword is related to one another. Generating and providing such an assorted list of related keywords, however, may overwhelm content providers with a multitude of complex information. From a human-computer interaction (HCI) perspective, the over-inclusion of keywords may lead to content providers designating inaccurate or otherwise irrelevant keywords to use in the selection of content items. The over-inclusion of keywords may also result in a lower likelihood that users will interact with the selected content items. Furthermore, without any additional filtering, the generated list of related keywords may overburden the server resulting in increased processing power consumption, inefficiency, and time in selecting the relevant content items for display at the client device.

To resolve these and other technical challenges, the present disclosure provides systems and methods of measuring semantic relevance of keywords by parsing information resources to identify or discover more accurate and relevant keywords. In overview, a server (e.g., a data processing system) can generate a list of keywords using a seed keyword provided by a content provider using a semantic relationship graph. The semantic relationship graph may specify a semantic distance between each keyword and the seed keyword. Based on the semantic distances among each of the keywords, the list of keywords may be classified into keyword categories, each having a subset of the keywords. The server can also identify information resources (e.g., webpages) of the content provider using domain names provided by the content provider, and can extract terms from the identified information resources.

For each keyword of the generated list, the server can calculate a keyword affinity score by measuring the number of times the keyword occurs along with the seed keyword across the information resources of the content provider. The keyword affinity score may also be weighed or adjusted based on a prominence location of the keyword itself on the respective information resource, a path level of the information resource, and a nominal frequency of the keyword in a general corpus, among others. If the keyword affinity score is greater than or equal to a predefined threshold score for individual keywords, the server can set the keyword as selected for use in selecting content items. On the other hand, if the keyword affinity score is less than the threshold score, the server can set the keyword as unselected for use in selecting content items.

Additionally, the server can calculate a category affinity score for each classified keyword category using the keyword affinity scores for the keywords of the keyword category. For example, the server can compute a weighted average sum of the keyword affinity scores to calculate the category affinity score. If the category affinity score is greater than or equal to a predefined threshold score for individual categories, the server can set the keyword category as selected for use in selecting content items. On the other hand, if the category affinity score is less than the threshold score, the server can set the keyword category as unselected for use in selecting content items. In addition to selecting or unselecting each keyword category, the server can set all the keywords of the keyword category as selected or unselected. The server can also set individual keywords of the keyword category as selected or unselected.

Certain keyword categories may not be appropriate to use in conjunction with other keyword categories in selecting content items. For example, there may be a semantic conflict between the keyword categories. To determine whether there is a semantic conflict, the server may use the semantic relationship graph to identify the semantic distance between each keyword across different keyword categories or to identify which keywords across the different keyword categories are designated as unrelated with one another. If there is a semantic conflict between two of the keyword categories, the server can compare the respective category affinity scores to resolve the semantic conflict. If the category affinity score of one keyword category is greater than the category affinity score of the other keyword category, the server can set the first keyword category as selected and the second keyword category as unselected for use in selecting content items.

The server can then transmit a list of keyword categories along with the keywords to the content provider computing device for display. The list of keyword categories may be part of instructions (e.g., a script) to display each keyword or keyword category in a user interface. The user interface in turn can be part of content selection management platform. The user interface can also indicate which keyword and keyword category is selected or unselected for user in selecting content items. In this manner, the content provider can differentiate which keywords and keyword categories have been selected or unselected, and may be better informed in designating which keywords or keyword categories to use in automatically selecting content items for display in content items.

FIG. 1 is a block diagram depicting one implementation of an environment for measuring the semantic relevance of keywords. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one client device 125. Each of the at least one content provider computing device 115, at least one content publisher computing device 120, or at least one client device 125 may be associated with, correspond to, or otherwise belong to a domain entity. The domain entity may be an account or otherwise a party associated with information resources. The domain entity may be identified by or associated with an entity identifier or a resource identifier. For example, the domain entity may be associated with the resource identifier "www.example1.com" and "www.example2.com." In this example, the domain entity may be associated with variants of the resource identifier, such as "www.example1.com/index" or "www.example2.com/ex2/folder3." Using the at least one content provider computing device 115, at least one content provider computing device 120, or at least one client device 125, the domain entity may host one or more information resources, each identified by one or more resource identifiers (e.g., uniform resource locators).

The network 105 may be any form of computer network that relays information between the content provider computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the content provider computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items for display on information resources at the client device 125. The content provided by the content provider computing device 115 can, for example, include third party content items for display on information resources, such as a website or web page that includes primary content, e.g. content provided by the content publisher computing device 120. The content items can also be displayed on a search results web page. For instance, the content provider computing device 115 can provide or be the source content items for display in content slots of content web pages, such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other client device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120. The web page can also include content slots configured for the display of third party content items from the content provider computing devices 115. For instance, the content publisher computing device 120 can operate the website of a company and can provide content about that company for display on web pages of the website. The web pages can, for example, include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can include a server for serving video content.

The client devices 125 can include computing devices configured to communicate via the network 105 to display data such as the content provided by the content publisher computing device 120 (e.g., primary web page content or other information resources) and the content provided by the content provider computing device 115 (e.g., third party content items configured for display in a content slot of a web page). The client device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client devices 125 can be communication devices through which an end user can submit requests to receive content. The requests can be requests to a search engine and the requests can include search queries. In some implementations, the requests can include a request to access a web page.

The content provider computing devices 115, the content publisher computing device 120 and the client devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120, and the client devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the client devices 125 (e.g., a built-in display, microphone, etc.) or external to the housing of content provider computing devices 115, the content publisher computing device 120 and the client devices 125 (e.g., a monitor connected to the content provider computing device 115, a speaker connected to the content provider computing device 115, etc.), according to various implementations. For example, the content provider computing devices 115, the content publisher computing device 120 and the client devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system. The data processing system 110 can include at least one keyword generator module 130, at least one resource parser module 135, at least one frequency calculator module 140 and at least one database 155. The keyword generator module 130, the resource parser module 135 the frequency calculator module 140, the keyword selector module 145, and the interface provider module 150 each can include at least one processing unit, server, virtual server, circuit, engine, agent, appliance, or other logic device such as programmable logic arrays configured to communicate with the database 155 and with other computing devices (e.g., the content provider computing device 115, the content publisher computing device 120, or the client device 125) via the network 105.

The keyword generator module 130, the resource parser module 135, the frequency calculator module 140, the keyword selector module 145, and the interface provider module 150 can include or execute at least one computer program or at least one script. The keyword generator module 130, the resource parser module 135, the frequency calculator module 140, the keyword selector module 145, and the interface provider module 150 can be separate components, a single component, or part of the data processing system 110. The keyword generator module 130, the resource parser module 135, the frequency calculator module 140, the keyword selector module 145, and the interface provider module 150 can include combinations of software and hardware, such as one or more processors configured to execute one or more scripts.

The data processing system 110 can also include one or more content repositories or databases 155. The databases 155 can be local to the data processing system 110. In some implementations, the databases 155 can be remote to the data processing system 110 but can communicate with the data processing system 110 via the network 105. The databases 155 can include a semantic relationship graph, a term dictionary, resource identifiers, and a keyword list interface script, among others. Additional details of the contents of the database 155 will be provided below.

The keyword generator module 130 can receive a seed keyword to generate additional keywords relevant to or otherwise associated with the seed keyword. In some implementations, the keyword generator module 130 can receive one or more seed keywords to generate additional keywords relevant to or otherwise associated with the one or more seed keywords. In some implementations, the one or more seed keywords can correspond to a seed phrase. The seed phrase may include one or more keywords. In some implementations, the seed keyword may be part of a request for additional keywords. The request for additional keywords may also include an entity identifier specifying a domain entity or one or more resource identifiers associated with the domain entity. The seed keyword may be received from the content provider computing device 115, the content publisher computing device 120, or the client device 125. In some implementations, the seed keyword may be received from a content selection and delivery management platform executed on any one of the content provider computing device 115, the content publisher computing device 120, or the client device 125. In some implementations, the content provider computing device 115, the content publisher computing device 120, or the client device 125 from which the seed keyword is received may correspond to, be associated with, or otherwise belong to the domain entity. Prior to further processing of the seed keyword, the keyword generator module 130 can generate or determine a canonical form for the seed keyword using a dictionary or look up table. The dictionary or the look up table may specify a canonical form for each variant of the word. The canonical form may be representative of a standardized lexical representation of the keyword. For example, if the received seed keyword is "mice," the keyword generator module 130 can generate "mouse" as the canonical form for the seed keyword by performing a look up on the dictionary specifying that "mouse" is the canonical form for "mice."

To generate additional keywords relevant to or otherwise associated with the seed keyword, the keyword generator module 130 can access a semantic relationship graph or a data structure (e.g., array, linked list, graph, tree, heap, etc.) from the databases 155. The semantic relationship graph may include a plurality of keywords or phrases. The semantic relationship graph may also specify, designate, or otherwise define a semantic distance or relevance measure between each of the keywords. The semantic relationship graph may be pre-generated using a plurality of preset keywords and predefined semantic distances or relevance measures between each of the keywords using natural language processing techniques. In some implementations, the plurality of keywords and the semantic distance or relevance measure between each of the keywords may be dynamically determined using natural language processing techniques. In some implementations, the plurality of keywords and the semantic distance or relevance measure between each of the keywords may be updated from time to time by applying natural language processing techniques to a corpus of keywords retrieved from a variety of sources (e.g., information resources, scanned books, etc.).

In some implementations, the semantic relationship graph can include a plurality of nodes and a plurality of edges. The plurality of nodes may each represent a keyword. In some implementations, the plurality of nodes may represent a phrase including two or more keywords. The plurality of edges may connect or link two of the plurality of nodes. Each of the plurality of edges may define or specify the semantic distance or relevance measure between the two keywords of the two respective nodes of the plurality of nodes in the semantic relationship graph. Each of the plurality of edges may also define or specify whether the two respective nodes of the plurality of nodes in the semantic relationship graph are semantically concurring or semantically conflicting. The semantic relationship graph may be implemented using any data structure, such as an array, linked list, tree, or heap, among others.

Using the semantic relationship graph, the keyword generator module 130 can identify or search for a node corresponding to the seed keyword. The node corresponding to the seed keyword may be referred to as a seed node or an initial node. In some implementations, the keyword generator module 130 can traverse the semantic relationship graph to identify the seed node. In some implementations, the keyword generator module 130 can search a look up table or dictionary to find the seed node within the semantic relationship graph. Each of the look up table and dictionary may be a data structure used to index or reference the keywords or the nodes of the semantic relationship graph. In some implementations, the data structure or structures for each of the look up table and the dictionary may be separate from the semantic relationship graph.

From the seed node corresponding to the seed keyword on the semantic relationship graph, the keyword generator module 130 can identify a set of nodes adjacent or connected to the seed node via a respective edge. In some implementations, the keyword generator module 130 can determine whether the adjacent node is semantically concurring or semantically conflicting with the seed node. For each of the adjacent or connected nodes having a keyword semantically concurring with the seed keyword, the keyword generator module 130 can identify a semantic distance of the respective edge from the seed node. The keyword generator module 130 can compare the semantic distance to a first semantic distance threshold. In some implementations, the first semantic distance threshold may be predefined. In some implementations, the keyword generator module 130 may calculate the first semantic distance threshold based on the semantic distances between each adjacent keyword and the seed keyword. For example, the keyword generator module 130 may set the first semantic distance threshold so as to filter out a certain percentage (e.g., 50-70%) of keywords adjacent to the seed keyword found during traversal. If the semantic distance of the respective edge between the seed node and the adjacent node is less than the first semantic distance threshold, the keyword generator module 130 can identify the node as a candidate node and can identify the corresponding keyword as a candidate keyword. The keyword generator module 130 can include the node in a set of candidate nodes. Each of the nodes in the set of candidate nodes can have a semantic distance less than the first semantic distance threshold from the seed node.

For each of the candidate nodes, the keyword generator module 130 can identify a set of nodes adjacent or connected to the respective candidate via a respective edge if any. The keyword generator module 130 can determine whether there are one or more nodes adjacent or connected to the respective candidate node. If there are one or more nodes adjacent or connected to the respective candidate node, the keyword generator module 130 can again identify a semantic distance of the respective edge for each candidate node. For each adjacent node, the keyword generator module 130 can identify a semantic distance between the adjacent node and the candidate node. The keyword generator module 130 can determine or calculate a total semantic distance between the adjacent node to the seed node via the candidate node. For example, the keyword generator module 130 can add the semantic distance between the seed node and the candidate node and the semantic distance between the node adjacent to the candidate node and the candidate node itself. The keyword generator module 130 can compare the total semantic distance between the adjacent node and the seed node to the semantic distance threshold. If the total semantic distance of the respective edge between the seed node and the node adjacent to the candidate node is less than the semantic distance threshold, the keyword generator module 130 can identify the adjacent node as a candidate node and can identify the corresponding keyword as a candidate keyword. In some implementations, the keyword generator module 130 can compare the semantic distance between the candidate node and the adjacent node to a second semantic distance threshold. The second semantic distance threshold may be less than or equal to the first semantic distance threshold for the distance between the seed and the original candidate node. In some implementations, the second semantic distance threshold may be predefined. In some implementations, the keyword generator module 130 can calculate the second semantic distance threshold based on the semantic distances between each adjacent keyword and the candidate keyword or between each keyword adjacent keyword and the seed keyword. For example, the keyword generator module 130 may set the second semantic distance threshold so as to filter out a certain percentage (e.g., 50-70%) of keywords adjacent to the candidate keyword found during traversal. If the semantic distance of the respective edge between the candidate node and the node adjacent to the candidate node is less than the other semantic distance threshold, the keyword generator module 130 can identify the adjacent node as a candidate node and can identify the corresponding keyword as a candidate keyword. The keyword generator module 130 can repeat this process for each node in the semantic relationship graph and can continue to add more nodes or keywords to the set of candidate keywords traversing the semantic relationship graph, until all the nodes within the semantic distance threshold of the seed node have been visited.

From the set of candidate nodes and keywords, the keyword generator module 130 can identify one or more keyword categories. Each keyword category may include one or more keywords identified as having a semantic distance from the seed keyword or another candidate keyword less than the semantic distance threshold. In some implementations, the keyword generator module 130 can apply a clustering algorithm to the set of candidate nodes and the respective semantic distances to one another candidate node to identify the one or more keyword categories. The clustering algorithm may be, for example, k-nearest neighbors (k-NN) algorithm, principal component analysis, (PCA), expectation-maximization (EM), and hierarchical cluster analysis (HCA), among others. In some implementations, the keyword generator module 130 can identify the semantic distances between each candidate keyword within the semantic relationship graph. In some implementations, the keyword generator module 130 can use the clustering algorithm to identify clusters of the candidate nodes based on the identified semantic distances. For example, using the k-NN algorithm, the keyword generator module 130 can designate an initial set of k nodes at random as a mean for k clusters, and assign the nearest node to the cluster. The keyword generator module 130 can then calculate a centroid using the identified semantic distances for each cluster and adjust the mean. In this example, the keyword generator module 130 may repeat these steps until convergence, when the mean for each cluster changes by less than a predetermined margin. In some implementations, the keyword generator module 130 can set or assign the keywords of the nodes in each cluster to a keyword category.

In some implementations, the keyword generator module 130 can identify one or more keyword categories based on a level or depth of the candidate node from the seed node. In some implementations, the keyword generator module 130 can identify the depth of the candidate node from the seed node via the respective edge on the semantic relationship graph. In some implementations, the keyword generator module 130 can identify a subset of candidate nodes that have a depth of one from the seed node. The keyword generator module 130 can set or assign each node of the identified subset of candidate nodes into a respective keyword category. For each node of the identified subset of candidate nodes, the keyword generator module 130 can identify nodes adjacent, connected, or nearest to respective candidate node. The keyword generator module 130 can set or assign the keyword of the identified nodes adjacent, connected, or nearest to the respective candidate to node the respective keyword category corresponding to the candidate node.

In some implementations, the keyword generator module 130 can identify a topical keyword for each keyword category representative of the respective keyword category. In some implementations, for each keyword category, the keyword generator module 130 can select a topical keyword from the one or more keywords of the keyword category. In some implementations, within each keyword category, the keyword generator module 130 can determine or calculate semantic distances between each of the keywords using the semantic relationship graph. In some implementations, for each keyword category, the keyword generator module 130 can identify a keyword with the minimum semantic distance from all the other keywords of the respective keyword category. In some implementations, the keyword generator module 130 can set the identified keyword with the minimum semantic distance from all the keywords in the keyword category as the topical keyword representative of the respective keyword category.

Figure 2:
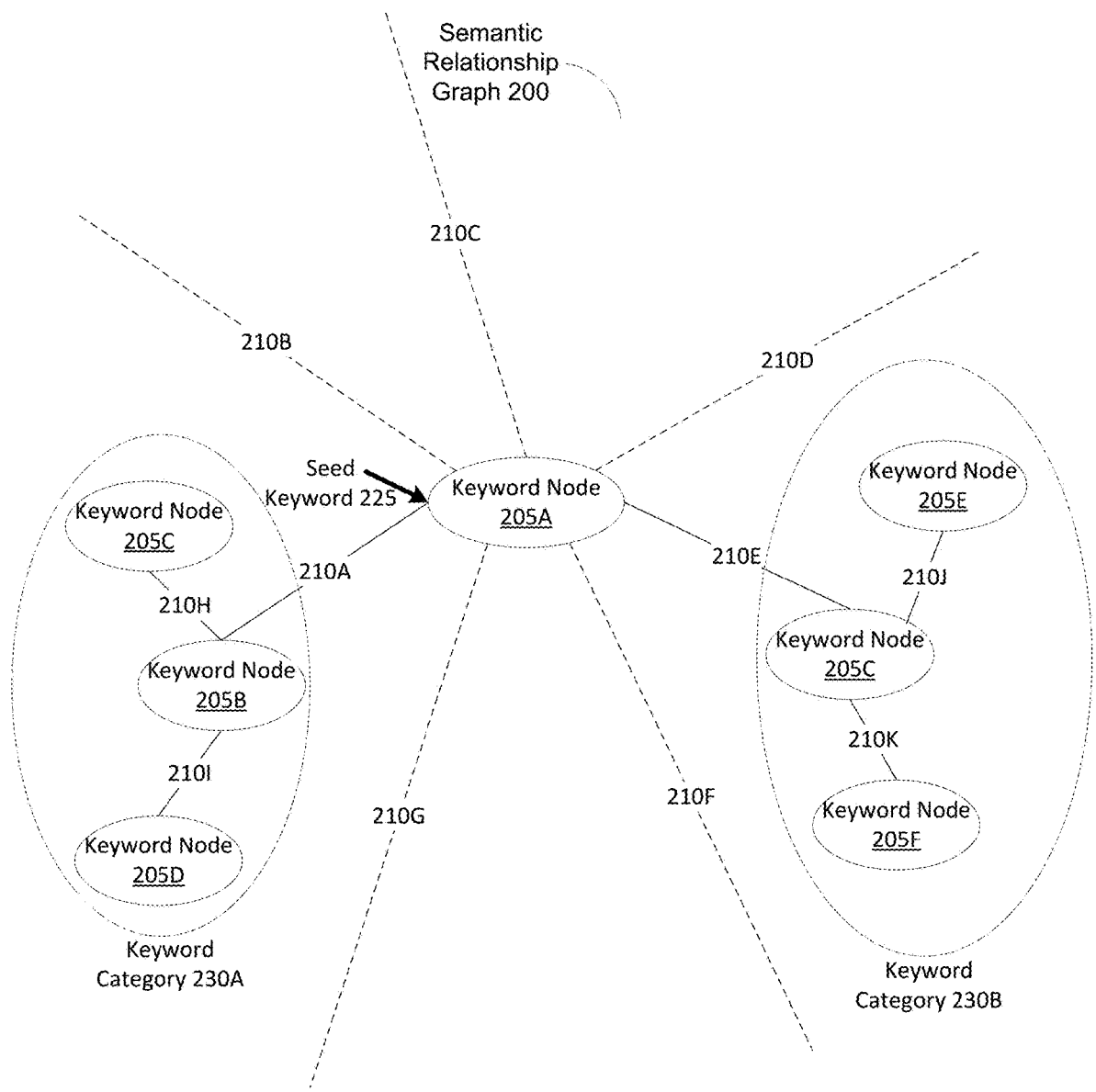
FIG. 2 is a block diagram depicting one implementation of a semantic relationship graph, according to an illustrative implementation.

Referring to FIG. 2, FIG. 2 is a block diagram depicting one implementation of a semantic relationship graph 200, according to an illustrative implementation. In the example depicted, the semantic relationship graph 200 can include seven keyword nodes 205A-F with edges 210A-K connecting each of the keyword nodes 205A-F. In the context of the data processing system 110 of FIG. 1, the keyword generator module 130 may have identified keyword node 205A as corresponding to that of the seed keyword 225. The keyword generator module 130 may then have identified all the adjacent nodes connected to the seed keyword node 205A connected via the edges 210A-G. The keyword generator module 130 may identify a semantic distance between the seed keyword node 205A and the adjacent nodes defined by the edges 210A-G. Out of the adjacent nodes, the keyword generator module 130 may have identified two of the adjacent nodes 205B and 205C as having semantic distances below the threshold and consequently as the candidate nodes. The keyword generator module 130 may then repeat the process again with the candidate nodes 205B and 205C. The keyword generator module 130 may have identified keyword nodes 205C and 205D as each having semantic distances defined by the edges 210H and 210I below the threshold from the seed keyword node 205A via keyword node 205B. Similarly, the keyword generator module 130 may have identified keyword nodes 205E and 205F as each having semantic distances defined by the edges 210J and 210K below the threshold from the seed keyword node 205A via keyword node 205C. The keyword generator module 130 can then apply a clustering algorithm to identify keyword nodes 205B, 205C, and 205D as a cluster and one keyword category 230A and keyword nodes 205C, 205E, and 205F as another cluster and another keyword category 230B.

Referring back to FIG. 1, to retrieve information resources to which to measure the semantic relevance of the keywords, the resource parser module 135 can identify one or more information resources of the domain entity. The domain entity may correspond to or be associated with at least one of the content provider computing device 115, the content publisher computing device 120, or the client device 125. The domain entity may be an account or otherwise a party associated with the information resources. The domain entity may be identified by or associated with an entity identifier or a resource identifier. In some implementations, the entity identifier or the resource identifier may be received with the seed keyword. The resource parser module 135 can search for or identify a plurality of resource identifiers associated with the domain entity. Each of the plurality of resource identifiers (e.g., universal resource locator (URL)) can include a host name and a path name (e.g., "www.example.com/level1/level2/page.html"). For example, the resource parser module 135 can use a network entity indexer (e.g., web crawler) to identify a multitude of information resources (e.g., web pages) available via the network 105 and find a subset of the identified information resources as belonging to the domain entity based on the host name of the resource identifier. In some implementations, the resource parser module 135 can receive resource identifiers for the plurality of information resources from the content provider computing device 115, the content publisher computing device 120, or the client device 125.

The resource parser module 135 can retrieve, obtain, or otherwise access the one or more information resources of the domain entity. The resource parser module 135 can parse the one or more accessed information resources of the domain entity to obtain, retrieve, or otherwise identify one or more keywords on the one or more accessed information resources. For each identified keyword, the resource parser module 135 can identify the associated resource identifier, the associated information resource, and one or more properties of the keyword from the information resource. For example, the one or more properties of the keyword may include a location on the information resource, a font type, a font size, and color, among others. The resource parser module 135 can store the keywords of the one or more information resources, the resource identifier associated with the keywords, and the one or more properties of the keywords on the databases 155.

Using the keywords of the one or more information resources identified by the resource parser module 135, the frequency calculator module 140 can generate a keyword-seed affinity score for each keyword of the set of candidate keywords or the keyword category. The keyword-seed affinity score may represent or indicate a frequency at which the seed keyword and the candidate keyword occur together on the one or more information resources of the domain entity. The frequency calculator module 140 can determine or otherwise calculate a frequency count at which the seed keyword and each candidate keyword occur in the one or more information resources. The frequency calculator module 140 can perform a search algorithm to determine whether the seed keyword and each candidate keyword occur in the one or more information resources. The searching algorithm can be, for example, a linear search, hashing, or binary search algorithm, among others. Each instance the seed keyword and the candidate keyword occur together across any of the information resources, the resource parser module 135 can increment the frequency count. For each candidate keyword, the frequency calculator module 140 can set the keyword-seed affinity score to the frequency count.

The frequency calculator module 140 can change or modify the keywords of the one or more information resources to a canonical form. In some implementations, the frequency calculator module 140 can identify a lexical match between the candidate keyword and any one of the keywords on the one or more information resources. The lexical match can be, for example, a character by character exact or similar match between the candidate keyword and any of the keywords of the one or more information resource. In some implementations, the frequency calculator module 140 can identify a keyword from the one or more information resources. In some implementations, the frequency calculator module 140 can compare characters of the keyword from the one or more information resources to characters of the candidate keyword to determine a one-to-one character match. If the characters of keyword of the one or more information is a one-to-one match to the characters of the candidate keyword, the frequency calculator module 140 can determine that there is a lexical match between the candidate keyword and the keyword of the one or more information resources.

In some implementations, the frequency calculator module 140 can use the semantic relationship graph to determine a semantic match between the candidate keyword and any one of the keywords on the one or more information resources. The frequency calculator module 140 can identify the node of the semantic relationship graph corresponding to the candidate keyword. The frequency calculator module 140 can determine whether the semantic distance between a node corresponding to any one of the keywords of the information resource and the identified node corresponding to the candidate keyword is less than a third semantic threshold. In some implementations, the third semantic distance threshold may be predefined. In some implementations, the frequency calculator module 140 can calculate the third semantic distance threshold based on the semantic distances between each candidate keyword and the keyword of the one or more information resources For example, the third semantic distance threshold may be set so as to filter out a certain percentage (e.g., 80-95%) of keywords related to the candidate keyword. If the frequency calculator module 140 determines that the third semantic distance is less than the semantic threshold, the frequency calculator module 140 can determine that there exists a semantic match between the between the candidate keyword and the keyword of the information resource.

Based on the frequency calculator module 140 determining that there is the lexical match or semantic match between the candidate keyword and any one of the keywords on the one or more information resources, the frequency calculator module 140 can calculate, increment, or otherwise update the frequency count for the candidate keyword. The frequency count may be a measure of the number of occurrences of the candidate keyword (either with a lexical match or a semantic match) appearing together with the seed keyword on the one or more information resources. In some implementations, the frequency calculator module 140 can maintain a counter to increment the frequency count for the candidate keyword.

The frequency calculator module 140 can generate or determine the keyword-seed affinity score from the frequency count. The keyword-seed affinity score may be a weighted measure of the number of occurrences of the candidate keyword (either with a lexical match or a semantic match) appearing together with the seed keyword on the one or more information resources. In some implementations, the frequency calculator module 140 can adjust the keyword-seed affinity score for the candidate keyword based on the semantic distance between the candidate keyword and the keyword of the information resource. The frequency calculator module 140 can adjust the keyword-seed affinity score for the candidate keyword based on the one or more properties of the respective keyword. In some implementations, the frequency calculator module 140 can determine or calculate a weighing factor to adjust the keyword-seed affinity score for the candidate keyword. The weighing factor may be based on a location of the keyword on the information resource. For example, the frequency calculator module 140 can increase the keyword-seed affinity score, if the corresponding candidate keyword appears relatively toward the top of the associated information resource. On the other hand, the frequency calculator module 140 can decrease the keyword-seed affinity score, if the corresponding candidate keyword appears relatively toward the bottom of the associated information resource.

In some implementations, the frequency calculator module 140 can determine or calculate a weighing factor to adjust the keyword-seed affinity score for the candidate keyword based on a font size of the candidate keyword on the one or more information resources of the domain entity. For example, the frequency calculator module 140 can increase the keyword-seed affinity score, if the corresponding candidate keyword is relatively larger than other keywords on the information resource. In contrast, the frequency calculator module 140 can decrease the keyword-seed affinity score, if the corresponding candidate keyword is relatively smaller than other keywords on the information resource.

In some implementations, the frequency calculator module 140 can adjust the keyword-seed affinity score for the candidate keyword based on a hierarchical depth or level of the information resource. The frequency calculator module 140 can identify the resource identifier for the information resource on which the lexical match or the semantic match between the candidate keyword and any of the keywords of the one or more information resources of the domain entity exists. The frequency calculator module 140 can parse the resource identifier to identify the hierarchical depth or the level of the information resource from the path name of the resource identifier. For example, if the resource identifier for the information resource upon which a lexical match occurred is "www.example.com/index/sub1/", the frequency calculator module 140 can identify that the hierarchical depth is two from the path name "/index/sub1/" based on the slashes.

The frequency calculator module 140 can adjust the keyword-seed affinity score or the frequency score by a normalization factor for the candidate keyword. In some implementations, the frequency calculator module 140 can identify a general corpus. The general corpus may specify a nominal or average frequency at which keywords occur. The general corpus may be retrieved from the databases 155 or across a plurality of information resources other than those belonging to the domain entity. The nominal frequency may be, for example, a term frequency-inverse document frequency (td-idf) measure. In some implementations, the frequency calculator module 140 can identify the nominal frequency of the candidate keyword from the general corpus. In some implementations, the frequency calculator module 140 can calculate or determine the normalization based on the nominal frequency of the candidate keyword identified from the general corpus. For example, the frequency calculator module 140 can identify a number of the information resources of the domain entity and calculate a quotient of the number of information resources and the nominal frequency from the general corpus as the normalization factor.

Figure 3:
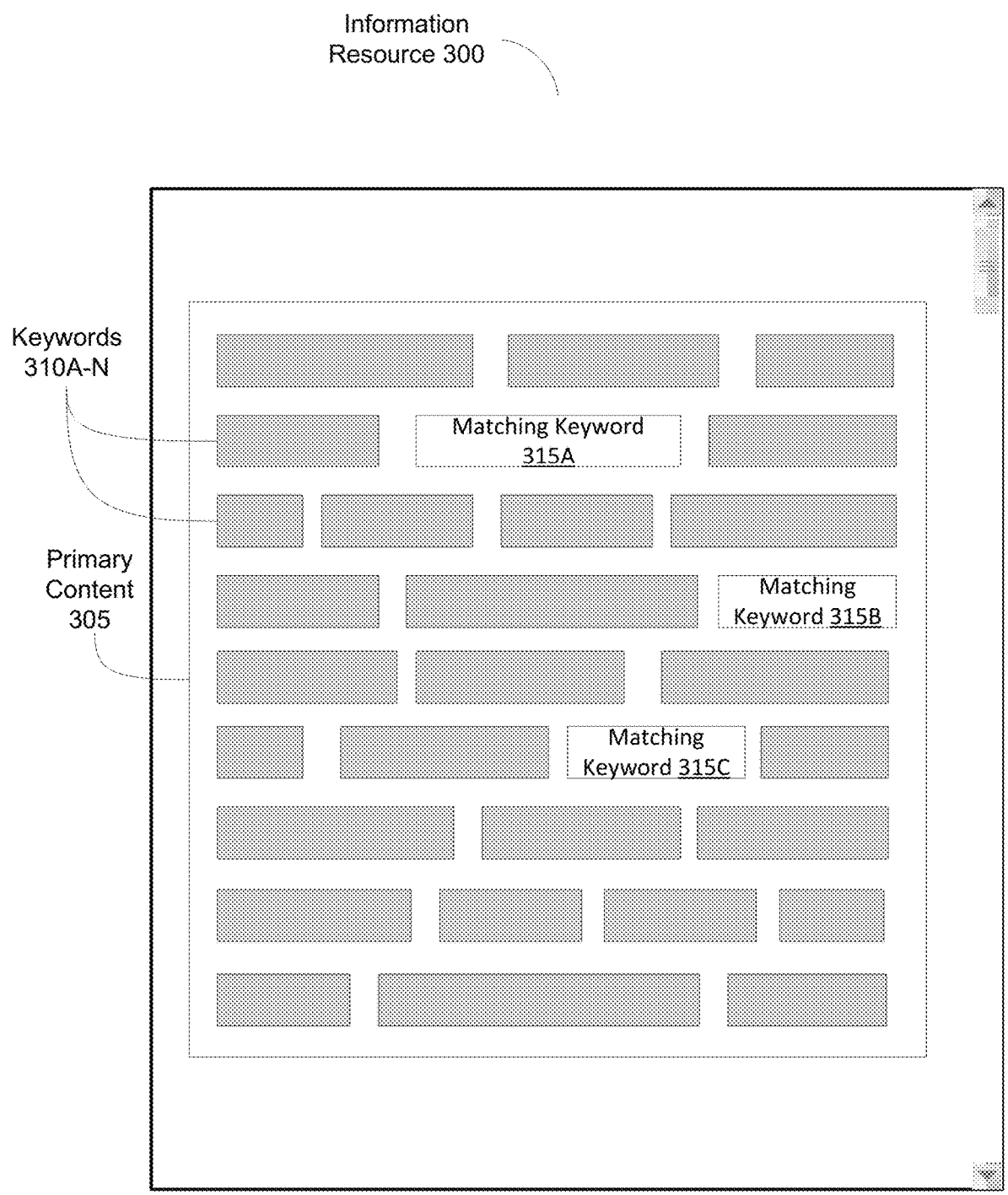
FIG. 3 is a block diagram of an information resource with one or more keywords matching the seed keyword or a keyword of a keyword category, according to an illustrative implementation.

Referring to FIG. 3, FIG. 0.3 is a block diagram of an information resource 300 with one or more keywords 315A-N matching the seed keyword or a keyword of a keyword category. The information resource 300 may be a single web page and may include primary content 305 as well as other secondary content elements. The primary content 305 can include one or more keywords 310A-N. In the context of the data processing system 110 of FIG. 1, the resource parser module 135 may have identified the information resource 300 as belonging to the domain entity from which the seed keyword was received. In addition, the resource parser module 135 may have parsed the information resource 300 to retrieve the one or more keywords 310A-N on the primary content 305 of the information resource 300. In conjunction with the resource parser module 135, the frequency calculator module 140 can search for the seed keyword and a candidate keyword of the set of candidate keywords or one of the keyword categories among the keywords 310A-N of the information resource 300. Through the search, the frequency calculator module 140 may have identified three keywords 315A-C with at least one 315A matching the seed keyword and the other one or two 315B and 315C matching one or two of the candidate keywords. Upon finding the matches, the frequency calculator module 140 can assign a frequency count to each of the candidate keywords. The frequency calculator module 140 can also calculate a keyword-seed affinity score from the frequency count and adjust the keyword-seed affinity score based on the location of the matching keywords 315A-C on the information resource. In this example, the frequency calculator module 140 can weigh the keyword-seed affinity score of the candidate keyword corresponding to matching keyword 315C lower than that of the candidate keyword corresponding to matching keyword 315B, as the keyword 315C appears lower on the information resource 300 compared to the keyword 315B.

Referring back to FIG. 1, the frequency calculator module 140 can generate or calculate a category-seed affinity score for each keyword category. In some implementations, the frequency calculator module 140 can calculate a combination score for the respective keyword category based on the keyword-seed affinity scores of each of the keywords in the keyword category. The combination score may be an average of the keyword-seed affinity scores for the keywords in the keyword category. In some implementations, the average may be a weighted average to account for the adjusting of the keyword-seed affinity score for the keywords of the keyword category. For example, while calculating the average of the keyword-seed affinity scores, the frequency calculator module 140 can adjust the average based on the one or more properties of the keywords, placement of the keywords, and among others. In some implementations, the frequency calculator module 140 can calculate the combination score for the respective keyword category based on the frequency counts for the keywords in the keyword category. The combination score may be an average of the frequency counts for the keywords in the respective keyword category.

The keyword selector module 145 can determine, identify, or select one or more keywords within keyword categories or individual candidate keywords as relevant or irrelevant to the seed keyword and the domain entity. To select individual keywords within a keyword category as relevant, the keyword selector module 145 can compare the keyword-seed affinity score to a keyword-seed affinity score threshold for each candidate keyword of the set of candidate keywords or each of the keyword categories. The frequency keyword selector module 145 can identify a subset of keywords within each keyword category for which the respective keyword-affinity score is greater than or less than or equal to the keyword-seed affinity score threshold. If the keyword-seed affinity score is greater than or equal to the keyword-seed affinity score threshold, the keyword selector module 145 can determine, identify, or select the respective keyword as relevant to the seed keyword and domain entity. If the keyword-seed affinity is less than the keyword-seed affinity score threshold, the keyword selector module 145 can determine, identify, or unselect the respective keyword as irrelevant to the seed keyword and domain entity.

In some implementations, for each candidate keyword of the set of candidate keywords, the keyword selector module 145 compare the frequency count to a threshold frequency count. In some implementations, the keyword selector module 145 can identify the subset of candidate keywords with a respective frequency count greater than or equal to, or less than the threshold frequency count. In some implementations, the threshold frequency count may be predefined. In some implementations, the keyword selector module 145 can dynamically set or determine the threshold frequency count based on the number of candidate keywords in the subset of keyword. For example, the keyword selector module 145 can set the threshold frequency count to filter a certain percentage (e.g., 40-60%) of the candidate keywords from the subset. If the frequency count is greater than or equal to the threshold frequency count, the keyword selector module 145 can determine, identify, or select the respective keyword as relevant to the seed keyword and domain entity. If the frequency count is less than the threshold frequency count, the keyword selector module 145 can determine, identify, or unselect the respective keyword as irrelevant to the seed keyword and domain entity.

In some implementations, for each candidate keyword of the set of candidate keywords, the keyword selector module 145 compare the keyword-seed affinity score to a keyword-seed affinity score threshold. In some implementations, the keyword selector module 145 can identify the subset of keywords in each keyword category with a respective keyword-seed affinity score greater than or equal to, or less than the keyword-seed affinity score threshold. In some implementations, the keyword-seed affinity score threshold may be predefined. In some implementations, the keyword selector module 145 can dynamically set or determine the keyword-seed affinity score threshold based on the number of keywords in the respective category. For example, the keyword selector module 145 can set the keyword-seed affinity score threshold to filter a certain percentage (e.g., 40-60%) of the candidate keywords from the keyword category. If the keyword-seed affinity score is greater than or equal to the keyword-seed affinity score threshold, the keyword selector module 145 can determine, identify, or select the respective keyword as relevant to the seed keyword and domain entity. If the keyword-seed affinity score is less than the keyword-seed affinity score threshold, the keyword selector module 145 can determine, identify, or unselect the respective keyword as irrelevant to the seed keyword and domain entity.

The keyword selector module 145 can determine, identify, or select one or more keyword categories or subsets of candidate keywords as relevant or irrelevant to the seed keyword and the domain entity. To select one or more keyword categories as relevant to the seed keyword and the domain entity, the keyword selector module 145 can compare the category-seed affinity scores of each keyword category to a category-seed affinity score threshold. The keyword selector module 145 can identify the category-seed affinity score of each keyword categories as greater than or less than or equal to the category-seed affinity score threshold. If the category-seed affinity score is greater than or equal to the category-seed affinity score threshold, the keyword selector module 145 can determine, identify, or select the respective keyword category as relevant to the seed keyword and domain entity. In some implementations, the keyword selector module 145 can determine, identify, or select the respective keyword category as relevant, while determining, identifying, or selecting a subset of the keywords in the keyword category as irrelevant. If the category-seed affinity score is less than the category-seed affinity score threshold, the keyword selector module 145 can determine, identify, or unselect the respective keyword category as irrelevant to the seed keyword and domain entity.

Using the semantic relationship graph, the keyword selector module 145 can identify or determine a semantic conflict between two or more keyword categories. Certain keyword categories may not be appropriate to use in conjunction with other keyword categories in selecting content items. For example, the keyword categories may be unrelated to each other (e.g., "squash" (racquet) versus "squash" (vegetable)). In some implementations, the keyword selector module 145 can identify or determine the semantic conflict based on edges of the semantic relationship graph. In some implementations, the keyword selector module 145 can identify or determine one or more nodes for each keyword in the keyword categories. In some implementations, by traversing the semantic relationship graph, the keyword selector module 145 can identify one or more nodes connecting each node representing a keyword. In some implementations, the keyword selector module 145 can whether each identified edge connecting the respective two nodes specify that each keyword represented by the two nodes is semantically conflicting. In some implementations, if an edge specifies that the two nodes representing keywords across two different keyword categories are semantically conflicting, the keyword selector module 145 can determine or identify a semantic conflict between the respective keyword categories. In some implementations, if an edge specifies that the two nodes representing keywords across two different keyword categories are not semantic conflicting, the keyword selector module 145 can identify a lack of a semantic conflict between the respective keyword categories.

In some implementations, the keyword selector module 145 can determine, calculate, or count a number of edges specifying that the connected nodes representing the respective keywords are semantically conflicting. In some implementations, the keyword selector module 145 can compare the number of edges specifying that the connected nodes representing the respective keywords are semantically conflicting to a threshold number. If the number of edges is greater than or equal to the threshold number, the keyword selector module 145 can identify a semantic conflict between the two respective keyword categories. If the number of edges is less than the threshold number, the keyword selector module 145 can identify a lack of a semantic conflict between the two respective keyword categories.

In some implementations, the keyword selector module 145 can determine that two or more keyword categories are semantically conflicting based on the semantic distances between the keywords across the two or more keyword categories. In some implementations, the keyword selector module 145 can traverse the semantic relationship graph to identify the semantic distances between each of the keywords across the two or more keyword categories. In some implementations, the keyword selector module 145 can compare a semantic distance for a keyword in one keyword category to another keyword in another keyword category to a semantic distance threshold. The semantic distance threshold may be different from the threshold used to identify the keywords in the keyword category from the seed keyword. If the semantic distance is greater than the semantic distance threshold, the keyword selector module 145 can identify or determine that a semantic conflict between the two respective keyword categories.

If a semantic conflict is identified or determined between the two or more keyword categories, the keyword selector module 145 can compare the respective category-seed affinity scores with one another. From comparing the category-seed affinity scores, the keyword selector module 145 can select the keyword category corresponding to the higher or highest category-seed affinity score. In some implementations, the keyword selector module 145 can determine, identify, or select the keyword category corresponding to the higher or highest category-seed affinity score as relevant to the seed keyword and domain entity. In some implementations, the keyword selector module 145 can determine, identify, or select the keyword category corresponding to the lower or lowest category-seed affinity score as irrelevant to the seed keyword and domain entity.

In some implementations, the keyword selector module 145 can determine or identify a semantic conflict between groups of keyword categories based on keyword categories identified as having semantic conflicts. In some implementations, the keyword selector module 145 can identify groups of keyword categories based on identification of a lack of a semantic conflict between the respective keyword categories. For example, there may be four keyword categories "A," "B," "C," and "D." Based on either the edges specifying the semantic conflicts between the nodes or the semantic distances, the keyword selector module 145 can identify a semantic conflicts between keyword categories "A" and "B," "A" and "C," and "B" and "D." From the identified semantic conflicts, the keyword selector module 145 can identify keyword categories "A" and "D" as one group and "B" and "C" as another group.

In some implementations, the keyword selector module 145 can determine or calculate a group-seed affinity score for each of the groups of keyword categories identified as having semantic conflicts with one another. In some implementations, the keyword selector module 145 can compare the group-seed affinity score for each of the groups of keyword categories to one another. In some implementations, the keyword selector module 145 can determine, identify, or select the group of keyword categories corresponding to the higher or highest group-seed affinity score as relevant to the seed keyword and domain entity. In some implementations, the keyword selector module 145 can determine, identify, or select the group of keyword categories corresponding to the lower or lowest category-seed affinity score as irrelevant to the seed keyword and domain entity.

The interface provider module 150 can generate an interface to indicate keyword categories and keywords of the keyword categories as selected or unselected based on the corresponding frequency count, the keyword-seed affinity score, the category-seed affinity score, or the group-seed affinity score. In some implementations, the interface may be part of an information resource or a separate application, among others. The interface may include one or more lists of keyword categories and keywords as selected or unselected. In some implementations, the list of keyword categories as selected may be different or separate from the list of keyword categories as unselected. The interface provider module 150 can transmit the interface to the content provider computing device 115, the content publisher computing device 120, or the client device 125 that sent the seed keyword. In some implementations, the interface provider module 150 can generate or transmit the interface, responsive to identifying or determining keywords or keyword categories as relevant or irrelevant to the seed keyword and the domain entity.

Figure 4:
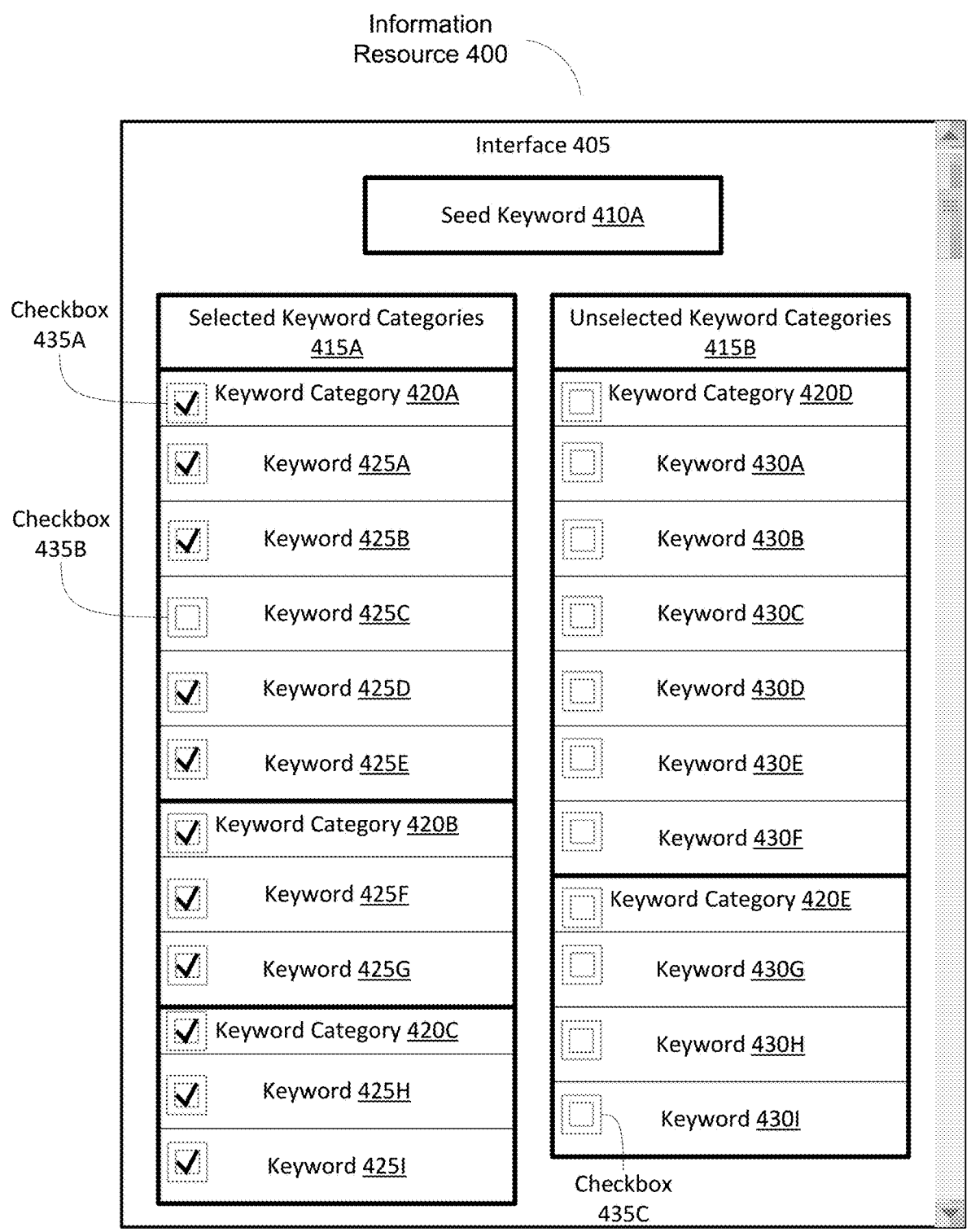
FIG. 4 is a block diagram of an information resource with an interface showing keywords and keyword categories generated from the seed keyword designated as selected or unselected, according to an illustrative implementation.

Referring to FIG. 4, FIG. 4 is a block diagram of an information resource 400 with an interface 405 showing keywords 425A-I and 430A-I and keyword categories 420A-D generated from the seed keyword designated as selected or unselected. The interface 405 may include an input for the seed keyword 410A, a list of selected keyword categories 415A, a list of unselected keyword categories 415B, one or more keyword categories 420A-E, and one or more keywords 425A-I and 430A-I. The list of selected keyword categories 415A may be generally along the left side of the information resource 400 and the list of unselected keyword categories 415B may be generally along the right side of the information resource 400. Under the selected keyword categories 415A column, some of the keywords may be selected (e.g., checkbox 435A) but some other keywords may be unselected (e.g., checkbox 435B). While under the unselected keyword categories 415B column, all of the keywords may be unselected (E.g., checkbox 435C).

In the context of FIG. 1, the keyword generator module 130 may have generated the keywords 420A-I and 430A-I and determined keyword categories 420A-E for each of the keywords 420A-I and 430A-I, using the semantic relationship graph and the seed keyword 410A. The resource parser module 135 may identified information resources belonging to the domain entity that submitted the seed keyword 410A. The frequency calculator module 140, in conjunction with the resource parser module 135, may have calculated the frequency count of the generated keywords and the seed keyword occurring together across the identified information resources. Using frequency count, the frequency calculator module 140 may have calculated a keyword-seed affinity score for each of the keywords, and then using the keyword-seed affinity scores for the keywords of the keyword category calculated a category-seed affinity score for the keyword category. The keyword selector module 145 may then have compared the category-seed affinity scores to a threshold score to identify certain categories as selected (420A-C) and other categories as unselected (e.g., 420D and 420E) as relevant to the seed keyword and the domain entity. In addition, the keyword selector module 145 may have determined individual keywords as selected or unselected, even when the keyword category is selected (e.g., keyword 425C as unselected under keyword category 420A as selected as indicated by the checkboxes 435A and 435B). The interface provider module 150 may have used the results to generate interface 405 with one column listing selected keyword categories 415A and another column listing unselected keyword categories 415B.

Referring to FIG. 5, FIG. 5 is another block diagram of an information resource 400 with an interface 405 showing keywords 425A-I and 430A-I and keyword categories 420A-D generated from the seed keyword designated as selected or unselected. In the context of FIG. 1, the seed keyword received from the domain entity may be "spatula 410A." By traversing the semantic relationship graph from the node corresponding to "spatula," the keyword generator module 130 may have identified keywords 425A-I and 430A-I, such as "steel" 425D, "handle" 425F, and "culinary" 430E. The keyword generator module 130 may have classified the generated keywords 425A-I and 430A-I into keyword categories "material" 420A, "component" 420B, "color" 420C, "discipline" 420D, and "service" 420E. The frequency calculator module 140, in conjunction with the resource parser module 135, may then have calculated the frequency count, the keyword-seed affinity score, and category-seed affinity score for each keyword 425A-I and 430A-I for each the keyword categories 420A-E. The keyword selector module 145 may compare the frequency counts and affinity scores to a threshold, and identify keyword categories 420A-C as selected and keyword categories 420D and 420E as unselected based on the comparison. From the results of the keyword selector module 145, the interface provider module 150 may then generate interface 405.

By traversing the semantic relationship graph to find additional keywords and parsing information resources of a domain entity to calculate the relevance and affinity of the keyword to the domain entity, the techniques detailed herein may improve the discovery of keyword nodes with more accurate and relevant keywords to use in content selection campaign platforms. The keywords and keyword categories generated using the semantic relationship graph may be filtered and classified as selected or unselected based on the relevance and affinity. These classifications may better inform the content provider in designating which keywords and keyword categories to utilize in the content selection campaign platform. In addition, the filtering may reduce processing power burdens, decrease time, and increase efficiency of servers during content selection and serving process, while improving the selection of more relevant content items. Furthermore, from a human-computer interaction (HCI) considerations, the selection of more relevant content items may result in a greater likelihood that end users will interact with the selected content item, thereby improving the user experience with the information resources the content item is displayed upon.

Figure 6:
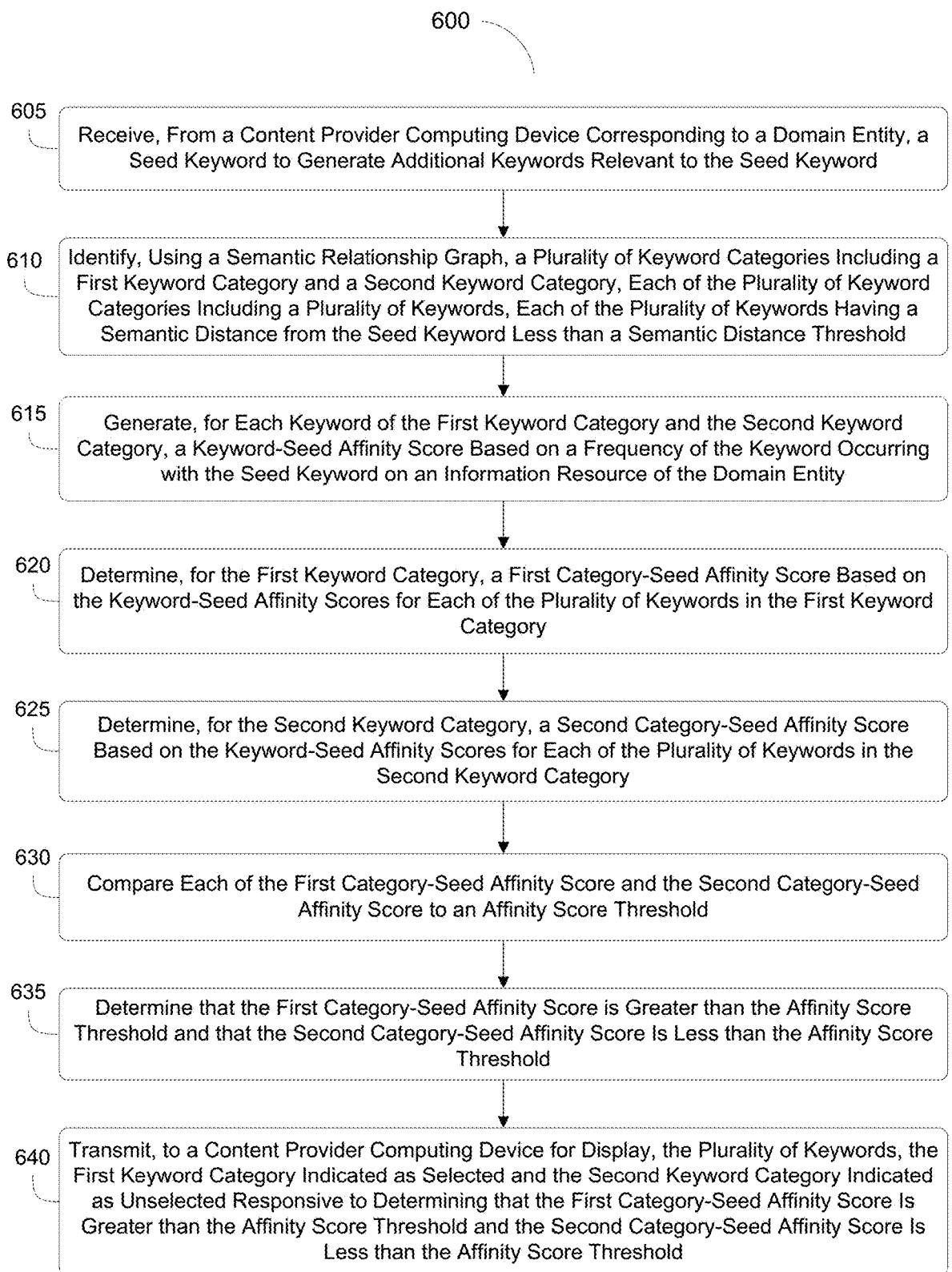
FIG. 6 is a flow diagram depicting a method of measuring the semantic relevance of keywords, according to an illustrative implementation; a FIGS. 7A-7D are flow diagrams depicting a method of measuring the semantic relevance of keywords by parsing information resources.
Figure 7A:
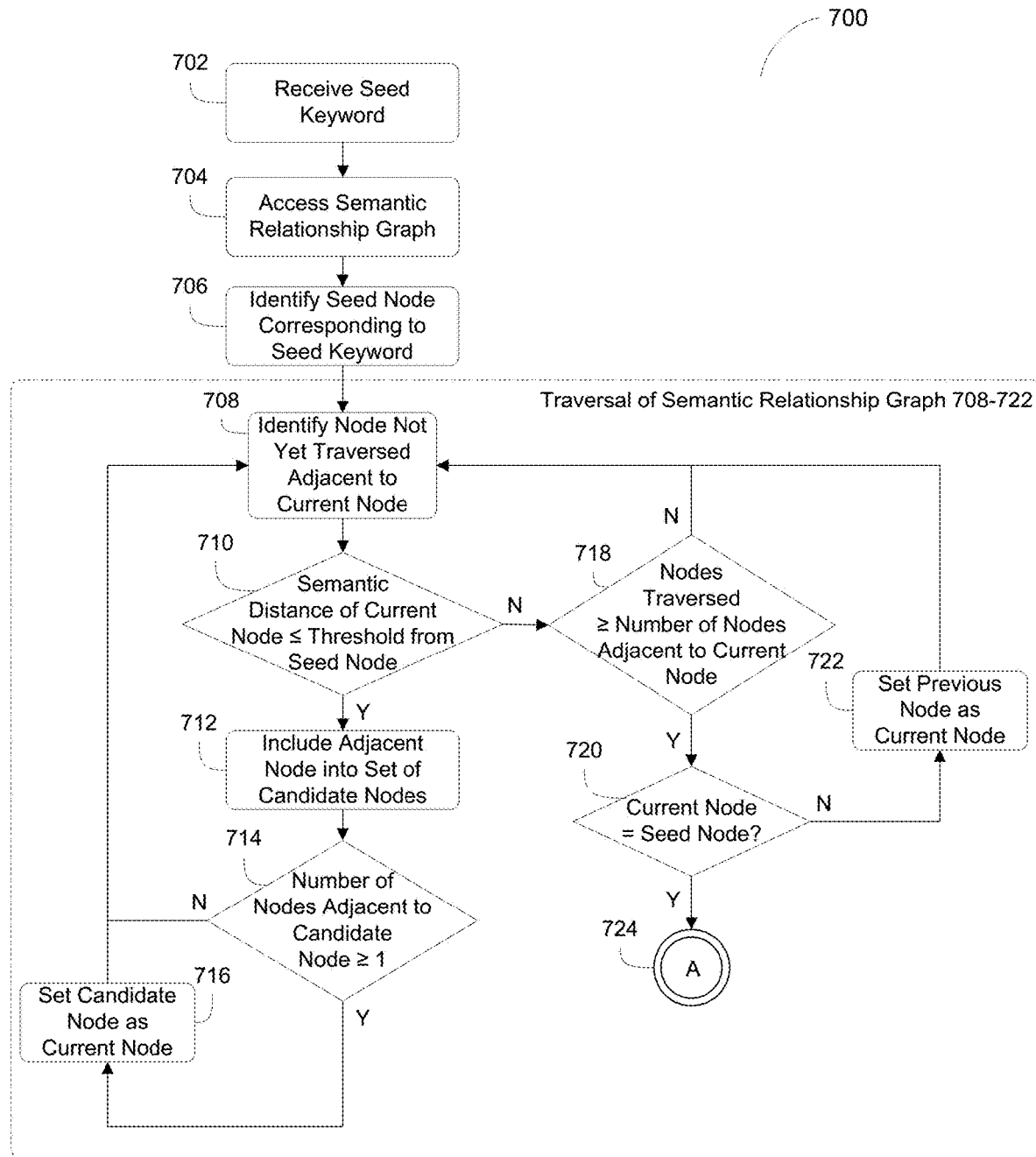
Figure 7B:
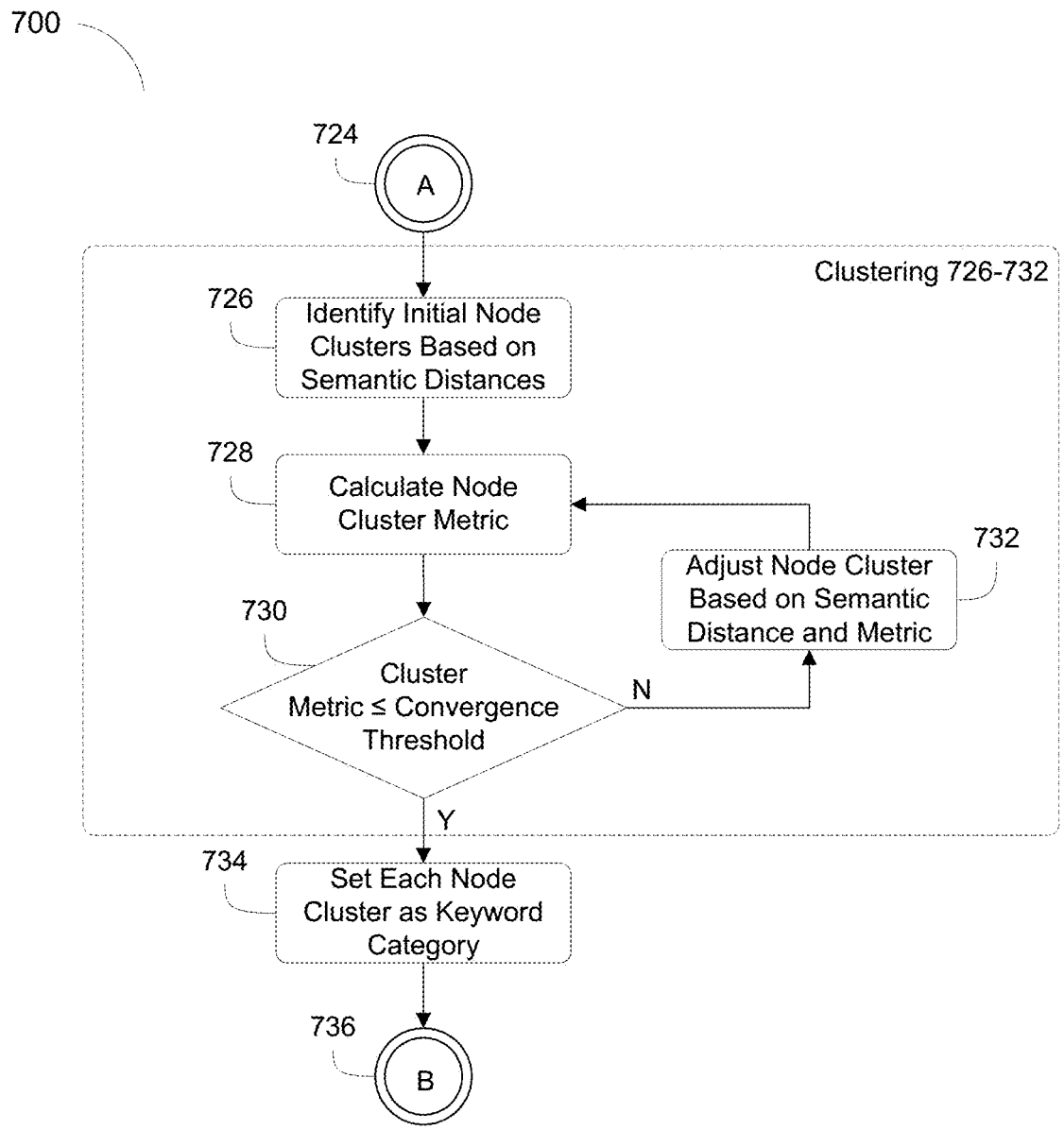
Figure 7C:
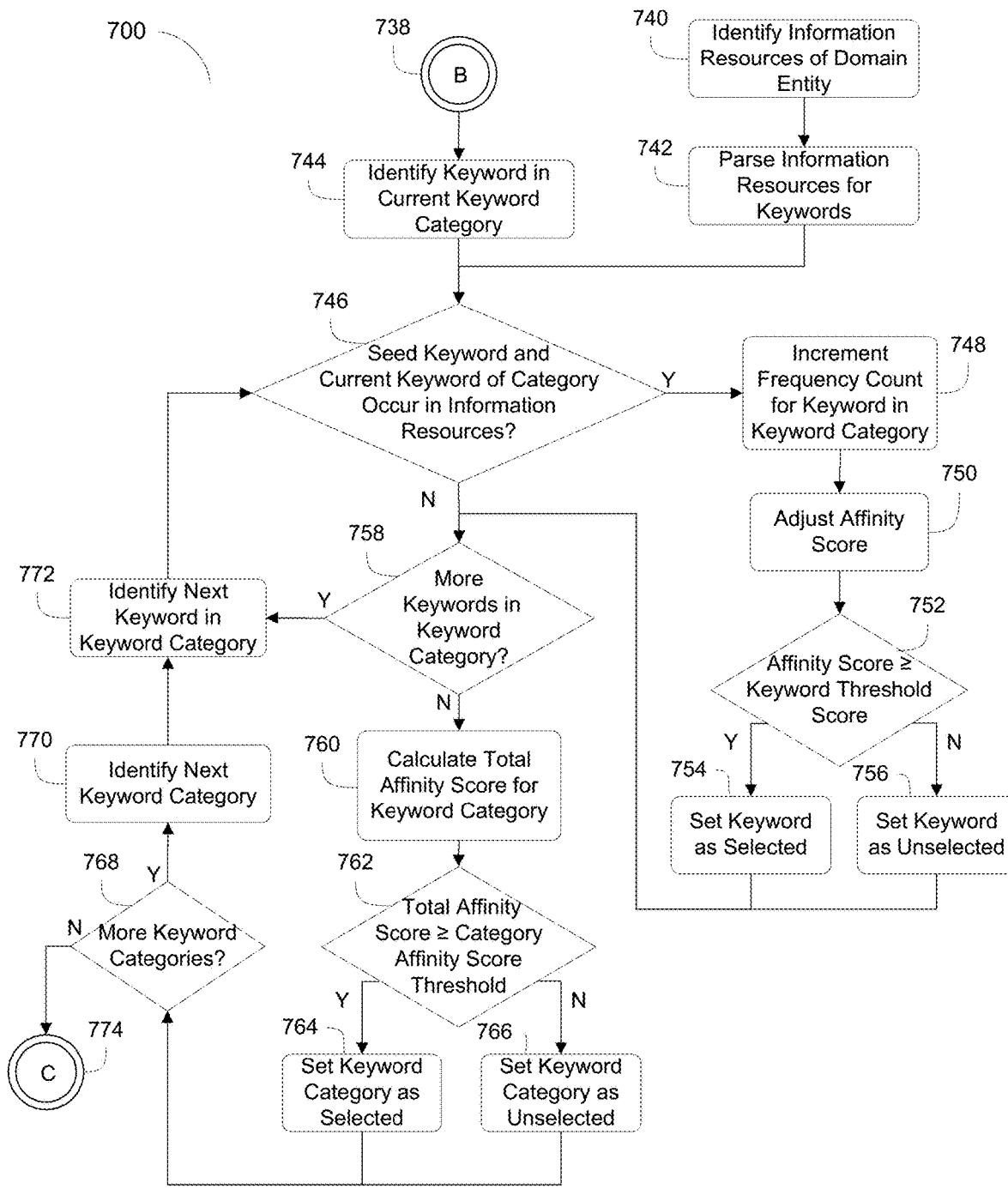
Figure 7D:
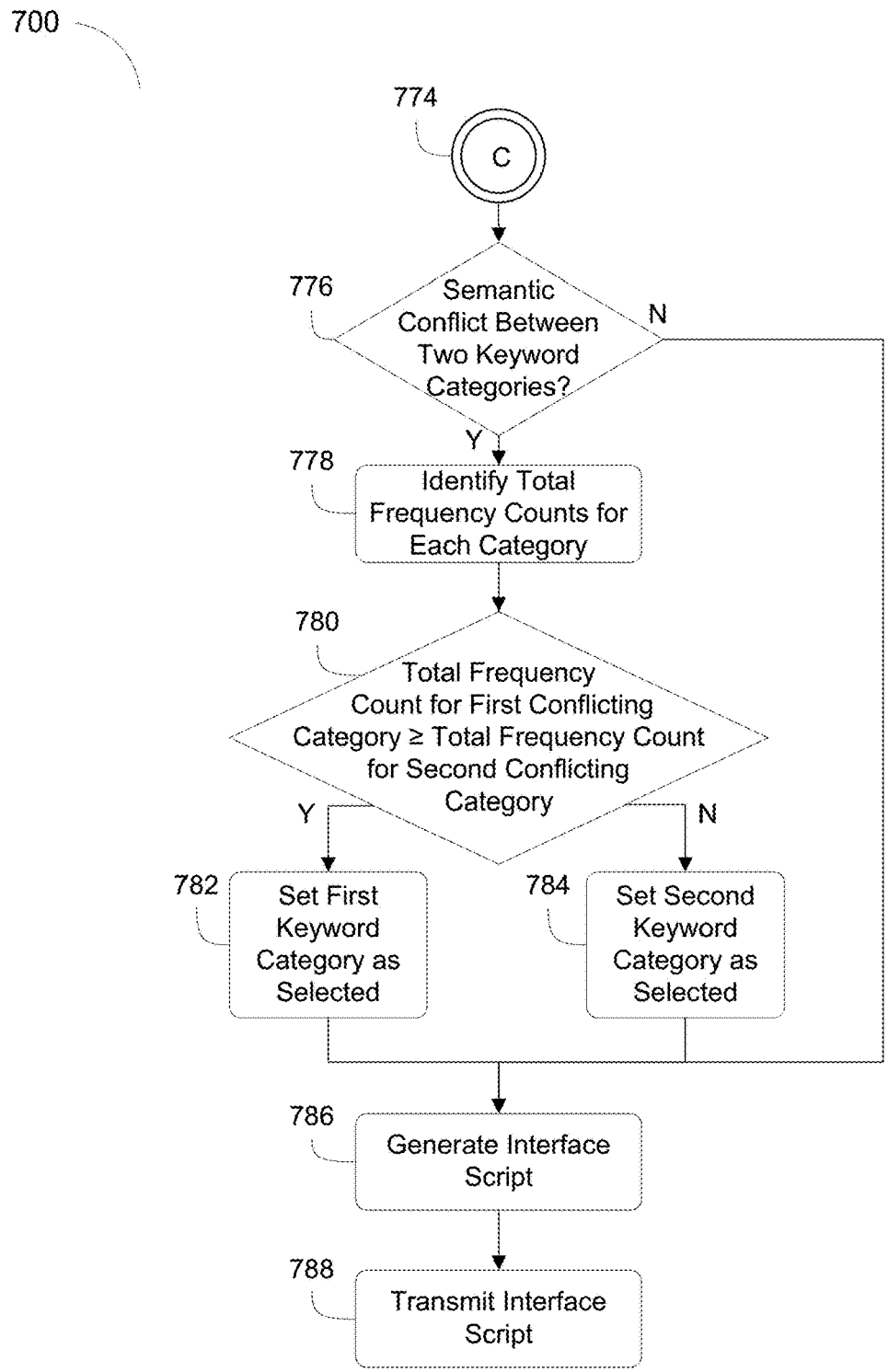

Referring to FIG. 6, FIG. 6 is a flow diagram depicting a method 600 of measuring the semantic relevance of keywords. The functionality described herein with respect to method 600 can be performed or otherwise executed by the data processing system 110, the content provider computing device 115, or any combination thereof. In brief overview, a data processing system can receive, from a content provider computing device corresponding to a domain entity, a seed keyword to generate additional keywords relevant to the seed keyword (BLOCK 605). The data processing system can identify, using a semantic relationship graph, a plurality of keyword categories including a first keyword category and a second keyword category (BLOCK 610). Each of the plurality of keyword categories can include a plurality of keywords. Each of the plurality of keywords can have a semantic distance from the seed keyword less than a semantic distance threshold. The data processing system can generate, for each keyword of the first keyword category and the second keyword category, a keyword-seed affinity score based on a frequency of the keyword occurring with the seed keyword on an information resource of the domain entity (BLOCK 615). The data processing system can determine, for the first keyword category, a first category-seed affinity score based on the keyword-seed affinity scores for each of the plurality of keywords in the first keyword category (BLOCK 620). The data processing system can determine, for the second keyword category, a second category-seed affinity score based on the keyword-seed affinity scores for each of the plurality of keywords in the second keyword category (BLOCK 625). The data processing system can compare each of the first category-seed affinity score and the second category-seed affinity score to an affinity score threshold (BLOCK 630). The data processing system can determine that the first category-seed affinity score is greater than the affinity score threshold and that the second category-seed affinity score is less than the affinity score threshold (BLOCK 635). The data processing system can transmit, to a content provider computing device for display, the plurality of keywords (BLOCK 640). The first keyword category can be indicated as selected and the second keyword category can be indicated as unselected responsive to determining that the first category-seed affinity score is greater than the affinity score threshold and the second category-seed affinity score is less than the affinity score threshold.

In further detail, the data processing system can receive, from a content provider computing device corresponding to a domain entity, a seed keyword to generate additional keywords relevant to the seed keyword (BLOCK 605). In some implementations, the data processing system can receive one or more seed keywords to generate additional keywords relevant to or otherwise associated with the one or more seed keywords. In some implementations, the one or more seed keywords can correspond to a seed phrase. The seed phrase may include one or more keywords. In some implementations, the seed keyword may be part of a request for additional keywords. The request for additional keywords may also include an entity identifier specifying a domain entity or one or more resource identifiers associated with the domain entity. The seed keyword may be received from the content provider computing device, the content publisher computing device, or the client device. In some implementations, the seed keyword may be received from a content selection and delivery management platform executed on any one of the content provider computing device, the content publisher computing device, or the client device. In some implementations, the content provider computing device, the content publisher computing device, or the client device from which the seed keyword is received may correspond to, be associated with, or otherwise belong to the domain entity. Prior to further processing of the seed keyword, the data processing system can generate or determine a canonical form for the seed keyword using a dictionary or look up table. The dictionary or the look up table may specify a canonical form for each variant of the word. The canonical form may be representative of a standardized lexical representation of the keyword. For example, if the received seed keyword is "mice," the data processing system can generate "mouse" as the canonical form for the seed keyword by performing a look up on the dictionary specifying that "mouse" is the canonical form for "mice."

The data processing system can identify, using a semantic relationship graph, a plurality of keyword categories including a first keyword category and a second keyword category (BLOCK 610). Each of the plurality of keyword categories can include a plurality of keywords. Each of the plurality of keywords can have a semantic distance from the seed keyword less than a semantic distance threshold. The semantic relationship graph may be traversed to discover or otherwise find additional keywords with quantifiably relevant to the seed keyword. The data processing system can access a semantic relationship graph or a data structure (e.g., array, linked list, graph, tree, heap, etc.) from the databases. The semantic relationship graph may include a plurality of keywords or phrases. The semantic relationship graph may also specify, designate, or otherwise define a semantic distance or relevance measure between each of the keywords. The semantic relationship graph may be pre-generated using a plurality of preset keywords and predefined semantic distances or relevance measures between each of the keywords using natural language processing techniques. In some implementations, the plurality of keywords and the semantic distance or relevance measure between each of the keywords may be dynamically determined using natural language processing techniques. In some implementations, the plurality of keywords and the semantic distance or relevance measure between each of the keywords may be updated from time to time by applying natural language processing techniques to a corpus of keywords retrieved from a variety of sources (e.g., information resources, scanned books, etc.).

In some implementations, the semantic relationship graph can include a plurality of nodes and a plurality of edges. The plurality of nodes may each represent a keyword. In some implementations, the plurality of nodes may represent a phrase including two or more keywords. The plurality of edges may connect or link two of the plurality of nodes. Each of the plurality of edges may define or specify the semantic distance or relevance measure between the two keywords of the two respective nodes of the plurality of nodes in the semantic relationship graph. Each of the plurality of edges may also define or specify whether the two respective nodes of the plurality of nodes in the semantic relationship graph are semantically concurring or semantically conflicting. The semantic relationship graph may be implemented using any data structure, such as an array, linked list, tree, or heap, among others.

Using the semantic relationship graph, the data processing system can identify or search for a node corresponding to the seed keyword. The node corresponding to the seed keyword may be referred to as a seed node or an initial node. In some implementations, the data processing system can traverse the semantic relationship graph to identify the seed node. In some implementations, the data processing system can search a look up table or dictionary to find the seed node within the semantic relationship graph. Each of the look up table and dictionary may be a data structure used to index or reference the keywords or the nodes of the semantic relationship graph. In some implementations, the data structure or structures for each of the look up table and the dictionary may be separate from the semantic relationship graph.

From the seed node corresponding to the seed keyword on the semantic relationship graph, the data processing system can identify a set of nodes adjacent or connected to the seed node via a respective edge. In some implementations, the data processing system can determine whether the adjacent node is semantically concurring or semantically conflicting with the seed node. For each of the adjacent or connected nodes having a keyword semantically concurring with the seed keyword, the data processing system can identify a semantic distance of the respective edge from the seed node. The data processing system can compare the semantic distance to a first semantic distance threshold. In some implementations, the first semantic distance threshold may be predefined. In some implementations, the data processing system may calculate the first semantic distance threshold based on the semantic distances between each adjacent keyword and the seed keyword. For example, the data processing system may set the first semantic distance threshold so as to filter out a certain percentage (e.g., 50-70%) of keywords adjacent to the seed keyword found during traversal. If the semantic distance of the respective edge between the seed node and the adjacent node is less than the first semantic distance threshold, the data processing system can identify the node as a candidate node and can identify the corresponding keyword as a candidate keyword. The data processing system can include the node in a set of candidate nodes. Each of the nodes in the set of candidate nodes can have a semantic distance less than the first semantic distance threshold from the seed node.

For each of the candidate nodes, the data processing system can identify a set of nodes adjacent or connected to the respective candidate via a respective edge if any. The data processing system can determine whether there are one or more nodes adjacent or connected to the respective candidate node. If there are one or more nodes adjacent or connected to the respective candidate node, the data processing system can again identify a semantic distance of the respective edge for each candidate node. For each adjacent node, the data processing system can identify a semantic distance between the adjacent node and the candidate node. The data processing system can determine or calculate a total semantic distance between the adjacent node to the seed node via the candidate node. For example, the data processing system can add the semantic distance between the seed node and the candidate node and the semantic distance between the node adjacent to the candidate node and the candidate node itself.

The data processing system can compare the total semantic distance between the adjacent node and the seed node to the semantic distance threshold. If the total semantic distance of the respective edge between the seed node and the node adjacent to the candidate node is less than the semantic distance threshold, the data processing system can identify the adjacent node as a candidate node and can identify the corresponding keyword as a candidate keyword. In some implementations, the data processing system can compare the semantic distance between the candidate node and the adjacent node to a second semantic distance threshold. The second semantic distance threshold may be less than or equal to the first semantic distance threshold for the distance between the seed and the original candidate node. In some implementations, the second semantic distance threshold may be predefined. In some implementations, the data processing system can calculate the second semantic distance threshold based on the semantic distances between each adjacent keyword and the candidate keyword or between each keyword adjacent keyword and the seed keyword. For example, the data processing system may set the second semantic distance threshold so as to filter out a certain percentage (e.g., 50-70%) of keywords adjacent to the candidate keyword found during traversal. If the semantic distance of the respective edge between the candidate node and the node adjacent to the candidate node is less than the other semantic distance threshold, the data processing system can identify the adjacent node as a candidate node and can identify the corresponding keyword as a candidate keyword. The data processing system can repeat this process for each node in the semantic relationship graph and can continue to add more nodes or keywords to the set of candidate keywords traversing the semantic relationship graph, until all the nodes within the semantic distance threshold of the seed node have been visited.

From the set of candidate nodes and keywords, the data processing system can identify one or more keyword categories. Each keyword category may include one or more keywords identified as having a semantic distance from the seed keyword or another candidate keyword less than the semantic distance threshold. In some implementations, the data processing system can apply a clustering algorithm to the set of candidate nodes and the respective semantic distances to one another candidate node to identify the one or more keyword categories. The clustering algorithm may be, for example, k-nearest neighbors (k-NN) algorithm, principal component analysis, (PCA), expectation-maximization (EM), and hierarchical cluster analysis (HCA), among others. In some implementations, the data processing system can identify the semantic distances between each candidate keyword within the semantic relationship graph. In some implementations, the data processing system can use the clustering algorithm to identify clusters of the candidate nodes based on the identified semantic distances. For example, using the k-NN algorithm, the data processing system can designate an initial set of k nodes at random as a mean for k clusters, and assign the nearest node to the cluster. The data processing system can then calculate a centroid using the identified semantic distances for each cluster and adjust the mean. In this example, the data processing system may repeat these steps until convergence, when the mean for each cluster changes by less than a predetermined margin. In some implementations, the data processing system can set or assign the keywords of the nodes in each cluster to a keyword category.

In some implementations, the data processing system can identify one or more keyword categories based on a level or depth of the candidate node from the seed node. In some implementations, the data processing system can identify the depth of the candidate node from the seed node via the respective edge on the semantic relationship graph. In some implementations, the data processing system can identify a subset of candidate nodes that have a depth of one from the seed node. The data processing system can set or assign each node of the identified subset of candidate nodes into a respective keyword category. For each node of the identified subset of candidate nodes, the data processing system can identify nodes adjacent, connected, or nearest to respective candidate node. The data processing system can set or assign the keyword of the identified nodes adjacent, connected, or nearest to the respective candidate to node the respective keyword category corresponding to the candidate node.

In some implementations, the data processing system can identify a topical keyword for each keyword category representative of the respective keyword category. In some implementations, for each keyword category, the data processing system can select a topical keyword from the one or more keywords of the keyword category. In some implementations, within each keyword category, the data processing system can determine or calculate semantic distances between each of the keywords using the semantic relationship graph. In some implementations, for each keyword category, the data processing system can identify a keyword with the minimum semantic distance from all the other keywords of the respective keyword category. In some implementations, the data processing system can set the identified keyword with the minimum semantic distance from all the keywords in the keyword category as the topical keyword representative of the respective keyword category.

The data processing system can generate, for each keyword of the first keyword category and the second keyword category, a keyword-seed affinity score based on a frequency of the keyword occurring with the seed keyword on an information resource of the domain entity (BLOCK 615). The keyword-seed affinity score can indicate the relevance of the keyword with not only the seed keyword but also to the keywords of the information resources associated with the domain entity. With the keyword-seed affinity score, the data processing system can improve the accuracy of discovering or finding keywords more relevant to the domain entity. To retrieve information resources to which to measure the semantic relevance of the keywords, the data processing system can identify one or more information resources of the domain entity. The domain entity may correspond to or be associated with at least one of the content provider computing device, the content publisher computing device, or the client device. The domain entity may be an account or otherwise a party associated with the information resources. The domain entity may be identified by or associated with an entity identifier or a resource identifier. In some implementations, the entity identifier or the resource identifier may be received with the seed keyword. The resource parser module 135 can search for or identify a plurality of resource identifiers associated with the domain entity. Each of the plurality of resource identifiers (e.g., universal resource locator (URL)) can include a host name and a path name (e.g., "www.example.com/level1/level2/page.html"). For example, the resource parser module 135 can use a network entity indexer (e.g., web crawler) to identify a multitude of information resources (e.g., web pages) available via the network 105 and find a subset of the identified information resources as belonging to the domain entity based on the host name of the resource identifier. In some implementations, the data processing system can receive resource identifiers for the plurality of information resources from the content provider computing device, the content publisher computing device, or the client device.

The data processing system can retrieve, obtain, or otherwise access the one or more information resources of the domain entity. The data processing system can parse the one or more accessed information resources of the domain entity to obtain, retrieve, or otherwise identify one or more keywords on the one or more accessed information resources. For each identified keyword, the data processing system can identify the associated resource identifier, the associated information resource, and one or more properties of the keyword from the information resource. For example, the one or more properties of the keyword may include a location on the information resource, a font type, a font size, and color, among others. The data processing system can store the keywords of the one or more information resources, the resource identifier associated with the keywords, and the one or more properties of the keywords on the databases.

Using the keywords of the one or more information resources identified by the data processing system, the data processing system can generate a keyword-seed affinity score for each keyword of the set of candidate keywords or the keyword category. The keyword-seed affinity score may represent or indicate a frequency at which the seed keyword and the candidate keyword occur together on the one or more information resources of the domain entity. The data processing system can determine or otherwise calculate a frequency count at which the seed keyword and each candidate keyword occur in the one or more information resources. The data processing system can perform a search algorithm to determine whether the seed keyword and each candidate keyword occur in the one or more information resources. The searching algorithm can be, for example, a linear search, hashing, or binary search algorithm, among others. Each instance the seed keyword and the candidate keyword occur together across any of the information resources, the data processing system can increment the frequency count. For each candidate keyword, the data processing system can set the keyword-seed affinity score to the frequency count.

The data processing system can change or modify the keywords of the one or more information resources to a canonical form. In some implementations, the data processing system can identify a lexical match between the candidate keyword and any one of the keywords on the one or more information resources. The lexical match can be, for example, a character by character exact or similar match between the candidate keyword and any of the keywords of the one or more information resource. In some implementations, the data processing system can identify a keyword from the one or more information resources. In some implementations, the data processing system can compare characters of the keyword from the one or more information resources to characters of the candidate keyword to determine a one-to-one character match. If the characters of keyword of the one or more information is a one-to-one match to the characters of the candidate keyword, the data processing system can determine that there is a lexical match between the candidate keyword and the keyword of the one or more information resources.

In some implementations, the data processing system can use the semantic relationship graph to determine a semantic match between the candidate keyword and any one of the keywords on the one or more information resources. The data processing system can identify the node of the semantic relationship graph corresponding to the candidate keyword. The data processing system can determine whether the semantic distance between a node corresponding to any one of the keywords of the information resource and the identified node corresponding to the candidate keyword is less than a third semantic threshold. In some implementations, the third semantic distance threshold may be predefined. In some implementations, the data processing system can calculate the third semantic distance threshold based on the semantic distances between each candidate keyword and the keyword of the one or more information resources For example, the third semantic distance threshold may be set so as to filter out a certain percentage (e.g., 80-95%) of keywords related to the candidate keyword. If the data processing system determines that the third semantic distance is less than the semantic threshold, the data processing system can determine that there exists a semantic match between the between the candidate keyword and the keyword of the information resource.

Based on the data processing system determining that there is the lexical match or semantic match between the candidate keyword and any one of the keywords on the one or more information resources, the data processing system can calculate, increment, or otherwise update the frequency count for the candidate keyword. The frequency count may be a measure of the number of occurrences of the candidate keyword (either with a lexical match or a semantic match) appearing together with the seed keyword on the one or more information resources. In some implementations, the data processing system can maintain a counter to increment the frequency count for the candidate keyword.

The data processing system can generate or determine the keyword-seed affinity score from the frequency count. The keyword-seed affinity score may be a weighted measure of the number of occurrences of the candidate keyword (either with a lexical match or a semantic match) appearing together with the seed keyword on the one or more information resources. In some implementations, the data processing system can adjust the keyword-seed affinity score for the candidate keyword based on the semantic distance between the candidate keyword and the keyword of the information resource. The data processing system can adjust the keyword-seed affinity score for the candidate keyword based on the one or more properties of the respective keyword. In some implementations, the data processing system can determine or calculate a weighing factor to adjust the keyword-seed affinity score for the candidate keyword. The weighing factor may be based on a location of the keyword on the information resource. For example, the data processing system can increase the keyword-seed affinity score, if the corresponding candidate keyword appears relatively toward the top of the associated information resource. On the other hand, the data processing system can decrease the keyword-seed affinity score, if the corresponding candidate keyword appears relatively toward the bottom of the associated information resource.

In some implementations, the data processing system can determine or calculate a weighing factor to adjust the keyword-seed affinity score for the candidate keyword based on a font size of the candidate keyword on the one or more information resources of the domain entity. For example, the data processing system can increase the keyword-seed affinity score, if the corresponding candidate keyword is relatively larger than other keywords on the information resource. In contrast, the data processing system can decrease the keyword-seed affinity score, if the corresponding candidate keyword is relatively smaller than other keywords on the information resource.

In some implementations, the data processing system can adjust the keyword-seed affinity score for the candidate keyword based on a hierarchical depth or level of the information resource. The data processing system can identify the resource identifier for the information resource on which the lexical match or the semantic match between the candidate keyword and any of the keywords of the one or more information resources of the domain entity exists. The data processing system can parse the resource identifier to identify the hierarchical depth or the level of the information resource from the path name of the resource identifier. For example, if the resource identifier for the information resource upon which a lexical match occurred is "www.example.com/index/sub1/", the data processing system can identify that the hierarchical depth is two from the path name "/index/sub1/" based on the slashes.

The data processing system can adjust the keyword-seed affinity score or the frequency score by a normalization factor for the candidate keyword. In some implementations, the data processing system can identify a general corpus. The general corpus may specify a nominal or average frequency at which keywords occur. The general corpus may be retrieved from the databases or across a plurality of information resources other than those belonging to the domain entity. The nominal frequency may be, for example, a term frequency-inverse document frequency (td-idf) measure. In some implementations, the data processing system can identify the nominal frequency of the candidate keyword from the general corpus. In some implementations, the data processing system can calculate or determine the normalization based on the nominal frequency of the candidate keyword identified from the general corpus. For example, the data processing system can identify a number of the information resources of the domain entity and calculate a quotient of the number of information resources and the nominal frequency from the general corpus as the normalization factor.

The data processing system can determine, for the first keyword category, a first category-seed affinity score based on the keyword-seed affinity scores for each of the plurality of keywords in the first keyword category (BLOCK 620). The data processing system can determine, for the second keyword category, a second category-seed affinity score based on the keyword-seed affinity scores for each of the plurality of keywords in the second keyword category (BLOCK 625). The category-seed affinity score can indicate the relevance of the keywords and the respective keyword categories with not only the seed keyword but also to the keywords of the information resources associated with the domain entity. With the category-seed affinity score, the data processing system can improve the accuracy of discovering or finding keywords more relevant to the domain entity. The data processing system can generate or calculate a category-seed affinity score for each keyword category. In some implementations, the data processing system can calculate a combination score for the respective keyword category based on the keyword-seed affinity scores of each of the keywords in the keyword category. The combination score may be an average of the keyword-seed affinity scores for the keywords in the keyword category. In some implementations, the average may be a weighted average to account for the adjusting of the keyword-seed affinity score for the keywords of the keyword category. For example, while calculating the average of the keyword-seed affinity scores, the data processing system can adjust the average based on the one or more properties of the keywords, placement of the keywords, and among others. In some implementations, the data processing system can calculate the combination score for the respective keyword category based on the frequency counts for the keywords in the keyword category. The combination score may be an average of the frequency counts for the keywords in the respective keyword category.

The data processing system can compare each of the first category-seed affinity score and the second category-seed affinity score to an affinity score threshold (BLOCK 630). The data processing system can determine that the first category-seed affinity score is greater than the affinity score threshold and that the second category-seed affinity score is less than the affinity score threshold (BLOCK 635). With the comparison between the affinity scores and the threshold, the data processing system can filter out, narrow, or otherwise reduce the number of keywords processed in selecting content items, thereby reducing processing power consumption at the data processing system. The data processing system can determine, identify, or select one or more keywords within keyword categories or individual candidate keywords as relevant or irrelevant to the seed keyword and the domain entity. To select individual keywords within a keyword category as relevant, the data processing system can compare the keyword-seed affinity score to a keyword-seed affinity score threshold for each candidate keyword of the set of candidate keywords or each of the keyword categories. The frequency data processing system can identify a subset of keywords within each keyword category for which the respective keyword-affinity score is greater than or less than or equal to the keyword-seed affinity score threshold. If the keyword-seed affinity score is greater than or equal to the keyword-seed affinity score threshold, the data processing system can determine, identify, or select the respective keyword as relevant to the seed keyword and domain entity. If the keyword-seed affinity is less than the keyword-seed affinity score threshold, the data processing system can determine, identify, or unselect the respective keyword as irrelevant to the seed keyword and domain entity.

In some implementations, for each candidate keyword of the set of candidate keywords, the data processing system compare the frequency count to a threshold frequency count. In some implementations, the data processing system can identify the subset of candidate keywords with a respective frequency count greater than or equal to, or less than the threshold frequency count. In some implementations, the threshold frequency count may be predefined. In some implementations, the data processing system can dynamically set or determine the threshold frequency count based on the number of candidate keywords in the subset of keyword. For example, the data processing system can set the threshold frequency count to filter a certain percentage (e.g., 40-60%) of the candidate keywords from the subset. If the frequency count is greater than or equal to the threshold frequency count, the data processing system can determine, identify, or select the respective keyword as relevant to the seed keyword and domain entity. If the frequency count is less than the threshold frequency count, the data processing system can determine, identify, or unselect the respective keyword as irrelevant to the seed keyword and domain entity.

In some implementations, for each candidate keyword of the set of candidate keywords, the data processing system compare the keyword-seed affinity score to a keyword-seed affinity score threshold. In some implementations, the data processing system can identify the subset of keywords in each keyword category with a respective keyword-seed affinity score greater than or equal to, or less than the keyword-seed affinity score threshold. In some implementations, the keyword-seed affinity score threshold may be predefined. In some implementations, the data processing system can dynamically set or determine the keyword-seed affinity score threshold based on the number of keywords in the respective category. For example, the data processing system can set the keyword-seed affinity score threshold to filter a certain percentage (e.g., 40-60%) of the candidate keywords from the keyword category. If the keyword-seed affinity score is greater than or equal to the keyword-seed affinity score threshold, the data processing system can determine, identify, or select the respective keyword as relevant to the seed keyword and domain entity. If the keyword-seed affinity is less than the keyword-seed affinity score threshold, the data processing system can determine, identify, or unselect the respective keyword as irrelevant to the seed keyword and domain entity.

The data processing system can determine, identify, or select one or more keyword categories or subsets of candidate keywords as relevant or irrelevant to the seed keyword and the domain entity. To select one or more keyword categories as relevant to the seed keyword and the domain entity, the data processing system can compare the category-seed affinity scores of each keyword category to a category-seed affinity score threshold. The data processing system can identify the category-seed affinity score of each keyword categories as greater than or less than or equal to the category-seed affinity score threshold. If the category-seed affinity score is greater than or equal to the category-seed affinity score threshold, the data processing system can determine, identify, or select the respective keyword category as relevant to the seed keyword and domain entity. In some implementations, the data processing system can determine, identify, or select the respective keyword category as relevant, while determining, identifying, or selecting a subset of the keywords in the keyword category as irrelevant. If the category-seed affinity score is less than the category-seed affinity score threshold, the data processing system can determine, identify, or unselect the respective keyword category as irrelevant to the seed keyword and domain entity.

Using the semantic relationship graph, the data processing system can identify or determine a semantic conflict between two or more keyword categories. Certain keyword categories may not be appropriate to use in conjunction with other keyword categories in selecting content items. For example, the keyword categories may be unrelated to each other (e.g., "squash" (racquet) versus "squash" (vegetable)). In some implementations, the data processing system can identify or determine the semantic conflict based on edges of the semantic relationship graph. In some implementations, the data processing system can identify or determine one or more nodes for each keyword in the keyword categories. In some implementations, by traversing the semantic relationship graph, the data processing system can identify one or more nodes connecting each node representing a keyword. In some implementations, the data processing system can whether each identified edge connecting the respective two nodes specify that each keyword represented by the two nodes is semantically conflicting. In some implementations, if an edge specifies that the two nodes representing keywords across two different keyword categories are semantically conflicting, the data processing system can determine or identify a semantic conflict between the respective keyword categories. In some implementations, if an edge specifies that the two nodes representing keywords across two different keyword categories are not semantic conflicting, the data processing system can identify a lack of a semantic conflict between the respective keyword categories.

In some implementations, the data processing system can determine, calculate, or count a number of edges specifying that the connected nodes representing the respective keywords are semantically conflicting. In some implementations, the data processing system can compare the number of edges specifying that the connected nodes representing the respective keywords are semantically conflicting to a threshold number. If the number of edges is greater than or equal to the threshold number, the data processing system can identify a semantic conflict between the two respective keyword categories. If the number of edges is less than the threshold number, the data processing system can identify a lack of a semantic conflict between the two respective keyword categories.

In some implementations, the data processing system can determine that two or more keyword categories are semantically conflicting based on the semantic distances between the keywords across the two or more keyword categories. In some implementations, the data processing system can traverse the semantic relationship graph to identify the semantic distances between each of the keywords across the two or more keyword categories. In some implementations, the data processing system can compare a semantic distance for a keyword in one keyword category to another keyword in another keyword category to a semantic distance threshold. The semantic distance threshold may be different from the threshold used to identify the keywords in the keyword category from the seed keyword. If the semantic distance is greater than the semantic distance threshold, the data processing system can identify or determine that a semantic conflict between the two respective keyword categories.

If a semantic conflict is identified or determined between the two or more keyword categories, the data processing system can compare the respective category-seed affinity scores with one another. From comparing the category-seed affinity scores, the data processing system can select the keyword category corresponding to the higher or highest category-seed affinity score. In some implementations, the data processing system can determine, identify, or select the keyword category corresponding to the higher or highest category-seed affinity score as relevant to the seed keyword and domain entity. In some implementations, the data processing system can determine, identify, or select the keyword category corresponding to the lower or lowest category-seed affinity score as irrelevant to the seed keyword and domain entity.

In some implementations, the data processing system can determine or identify a semantic conflict between groups of keyword categories based on keyword categories identified as having semantic conflicts. In some implementations, the data processing system can identify groups of keyword categories based on identification of a lack of a semantic conflict between the respective keyword categories. For example, there may be four keyword categories "A," "B," "C," and "D." Based on either the edges specifying the semantic conflicts between the nodes or the semantic distances, the data processing system can identify a semantic conflicts between keyword categories "A" and "B," "A" and "C," and "B" and "D." From the identified semantic conflicts, the data processing system can identify keyword categories "A" and "D" as one group and "B" and "C" as another group.

In some implementations, the data processing system can determine or calculate a group-seed affinity score for each of the groups of keyword categories identified as having semantic conflicts with one another. In some implementations, the data processing system can compare the group-seed affinity score for each of the groups of keyword categories to one another. In some implementations, the data processing system can determine, identify, or select the group of keyword categories corresponding to the higher or highest group-seed affinity score as relevant to the seed keyword and domain entity. In some implementations, the data processing system can determine, identify, or select the group of keyword categories corresponding to the lower or lowest category-seed affinity score as irrelevant to the seed keyword and domain entity.

The data processing system can transmit, to a content provider computing device for display, the plurality of keywords (BLOCK 640). The first keyword category can be indicated as selected and the second keyword category can be indicated as unselected responsive to determining that the first category-seed affinity score is greater than the affinity score threshold and the second category-seed affinity score is less than the affinity score threshold. Providing the plurality of keywords with subsets indicated as relevant or irrelevant may better inform content providers in selecting more relevant keywords to use in content selection campaigns. As a result, the content items chosen and provided to client devices for display may be more relevant to each end user and may lead to higher interaction rates, thereby improving human-computer interactions (HCI) and user experience with the information resources upon which the content item is displayed. The data processing system can generate an interface to indicate keyword categories and keywords of the keyword categories as selected or unselected based on the corresponding frequency count, the keyword-seed affinity score, the category-seed affinity score, or the group-seed affinity score. In some implementations, the interface may be part of an information resource or a separate application, among others. The interface may include one or more lists of keyword categories and keywords as selected or unselected. In some implementations, the list of keyword categories as selected may be different or separate from the list of keyword categories as unselected. The data processing system can transmit the interface to the content provider computing device, the content publisher computing device, or the client device that sent the seed keyword. In some implementations, the data processing system can generate or transmit the interface, responsive to identifying or determining keywords or keyword categories as relevant or irrelevant to the seed keyword and the domain entity.

Referring to FIGS. 7A-7D, FIGS. 7A-7D are flow diagrams depicting a method 700 of measuring the semantic relevance of keywords. The functionality described herein with respect to method 700 can be performed or otherwise executed by the data processing system 110, the content provider computing device 115, or any combination thereof. In further detail, a data processing system can receive a seed keyword (BLOCK 702). The seed keyword may be received from a computing device and may be used to generate additional keywords relevant to the seed keyword. The data processing system can access a semantic relationship graph (BLOCK 704). The semantic relationship graph may include a plurality of keywords or phrases. The semantic relationship graph may specify, designate, or otherwise define a semantic distance or relevance measure between each of the keywords or phrases. The data processing system can identify a seed node corresponding to the seed keyword from the semantic relationship graph (BLOCK 706). From BLOCK 708 to 722, the data processing system can traverse the semantic relationship graph to identify keywords relevant to the seed keyword. Other functionalities or algorithms may be used to traverse the semantic relationship graph. The data processing system can identify a node not yet traversed adjacent to the seed node or current node (BLOCK 708). The data processing system can determine whether the semantic distance of the current node from the seed node is less than or equal to a threshold (BLOCK 710). If the semantic distance is less than or equal to the threshold, the data processing system can include the adjacent node into a set of candidate nodes (BLOCK 712). The data processing system can determine whether the number of nodes adjacent to the candidate node is greater than or equal to one (BLOCK 714). If the number of nodes adjacent to the candidate node is greater than or equal to one, the data processing system can set the candidate node as the current node (BLOCK 716). In either case, the data processing system can return to the functionality of BLOCK 708. If the semantic distance is greater than the threshold, the data processing system can determine whether the number of nodes traversed is greater than or equal to the number of nodes adjacent to the current node (BLOCK 718). If not, the data processing system can return to the functionality of BLOCK 708. If so, the data processing system can determine whether the current node is the seed node (BLOCK 720). If the current node is not the seed node, the data processing system can set the previously referenced node as the current node (BLOCK 722), and return to the functionality of BLOCK 708. If the current node is the seed node, the data processing system can continue onto BLOCK 724.

The data processing system can cluster the identified keywords into keyword categories from BLOCK 726 to 732. Other functionalities and algorithms may be used to identify keyword categories. From BLOCK 724, the data processing system can identify initial node clusters based on semantic distances from each other (BLOCK 726). The data processing system can calculate a node cluster metric (e.g., centroid, mean, average, etc.) based on the semantic distances (BLOCK 728). The data processing system can determine whether the cluster metric is less than or equal to the convergence threshold (BLOCK 730). If not, the data processing system can adjust the node cluster based on the semantic distances and the cluster metric (BLOCK 732), and repeat the functionality of BLOCK 728. If so, the data processing system can set each node cluster as a keyword category (BLOCK 734), and continue onto BLOCK 736.

Separate or in parallel from to the other functionalities, the data processing system can identify information resources of the domain entity (BLOCK 740). The data processing system can parse the information resources for keywords thereon (BLOCK 742). From BLOCK 736, the data processing system can identify a keyword from one of the keyword categories (BLOCK 744). The data processing system can determine whether the seed keyword and the current keyword of the keyword category occur across the information resource (BLOCK 746).

If the seed keyword and the current keyword occur across the information resources, the data processing system can increment the frequency count for the keyword in the keyword category (BLOCK 748). The data processing system can calculate and adjust a keyword affinity score based on the frequency count a variety of factors (e.g., location of keyword on information resource) (BLOCK 750). The data processing system can determine whether the keyword affinity score for the keyword in the keyword category is greater than or equal to the keyword threshold score (BLOCK 752). If the keyword affinity score is greater than or equal to the keyword threshold score, the data processing system can set the keyword as selected (BLOCK 754). If the keyword affinity score is less than the keyword threshold score, the data processing system can set the keyword as unselected (BLOCK 756).

If the seed keyword and the current keyword do not across the information resources, the data processing system can determine whether there are any more keywords in the current keyword category (BLOCK 758). If so, the data processing system can identify the next keyword in the keyword category (BLOCK 772). If not, the data processing system can calculate a category affinity score for the keyword category based on the keyword affinity scores of each of the keywords of the keyword category (BLOCK 760). The data processing system can determine whether the total category affinity score is greater than or equal to the category affinity score threshold (BLOCK 762). If so, the data processing system can set the keyword category as selected (BLOCK 764). If not, the data processing system can set the keyword category as unselected (BLOCK 766). In either event, the data processing system can determine whether there are any more keyword categories (BLOCK 768). If there are more keyword categories, the data processing system can identify the next keyword category (BLOCK 770), can identify a keyword in the next keyword category (BLOCK 772), and can repeat the functionality of BLOCK 746. If there are no more keyword categories, the data processing system can continue onto BLOCK 774.

From BLOCK 774, the data processing system can identify whether there are any semantic conflicts between any two keyword categories using the semantic relationship graph (BLOCK 776). If so, the data processing system can identify the total frequency counts for each keyword category with a semantic conflict (BLOCK 778). The data processing system can determine whether the total frequency count for one keyword category is greater than or equal to the total frequency count for another keyword category with the semantic conflict (BLOCK 780). If so, the data processing system can set the first keyword category as selected (BLOCK 782). If not, the data processing system can set the other keyword category as selected (BLOCK 784). In any event, the data processing system can generate the interface script using the selected and unselected keywords and keyword categories (BLOCK 786). The data processing system can transmit the interface script to the computing device that provided the seed keyword (BLOCK 788).

Figure 8:
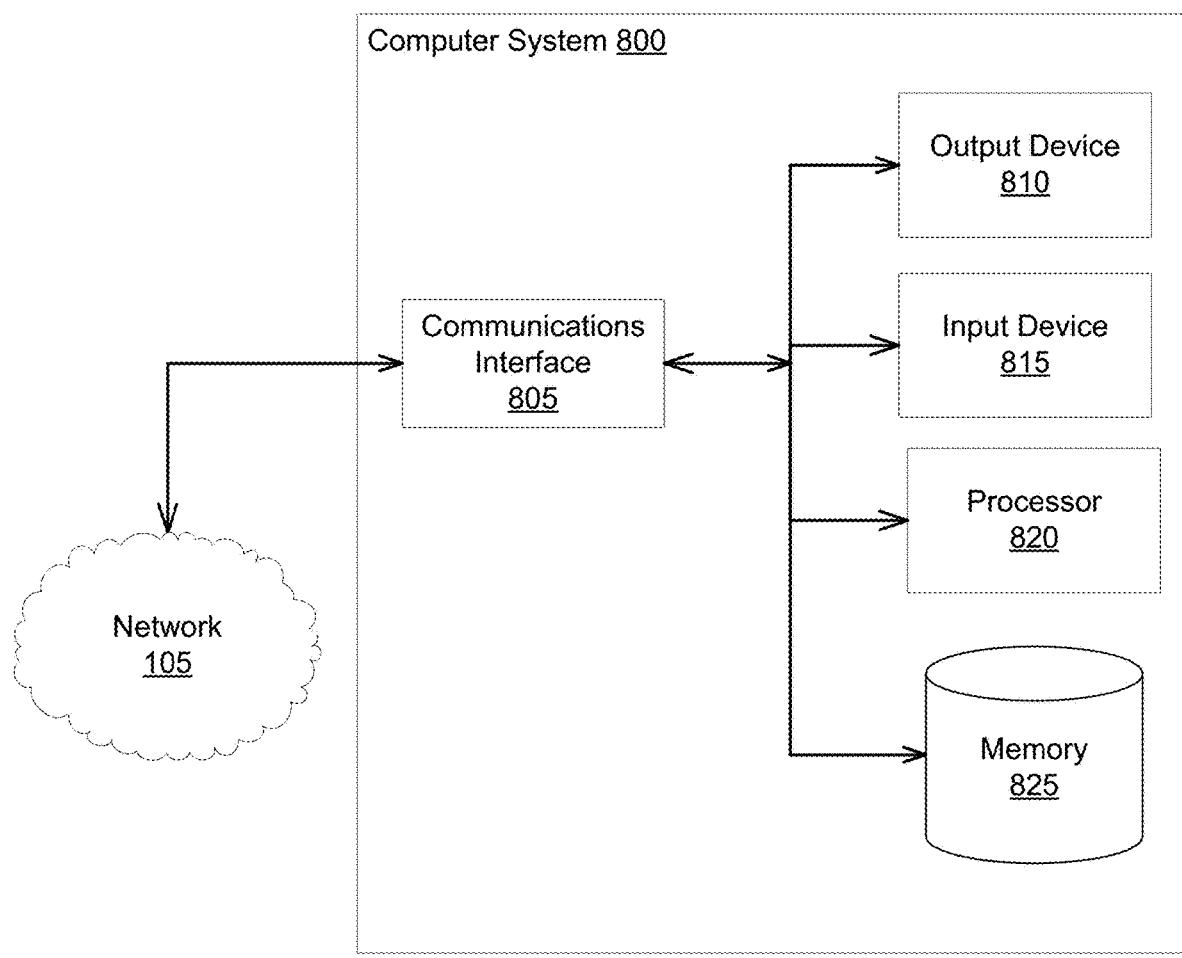
FIG. 8 is a block diagram illustrating a general architecture for a computer system that may be employed to implement elements of the systems and methods described and illustrated herein, according to an illustrative implementation.

FIG. 8 shows the general architecture of an illustrative computer system 800 that may be employed to implement any of the computer systems discussed herein (including the system 110 and its components such as the keyword generator module 130, the resource parser module 135, and frequency calculator module 140) in accordance with some implementations. The computer system 800 can be used to provide information via the network 105 for display. The computer system 800 of FIG. 8 comprises one or more processors 820 communicatively coupled to memory 825, one or more communications interfaces 805, and one or more output devices 810 (e.g., one or more display units) and one or more input devices 815. The processors 820 can be included in the data processing system 110 or the other components of the system 110 such as the keyword generator module 130, the resource parser module 135, the frequency calculator module 140, the keyword selector module 145, and the interface provider module 150.

In the computer system 800 of FIG. 8, the memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 825 to store information related to the availability of inventory of one or more content units, reservations of one or more content units, among others. The memory 825 can include the database 155. The processor(s) 820 shown in FIG. 8 may be used to execute instructions stored in the memory 825 and, in so doing, also may read from or write to the memory various information processed and or generated pursuant to execution of the instructions.

The processor 820 of the computer system 800 shown in FIG. 8 also may be communicatively coupled to or control the communications interface(s) 805 to transmit or receive various information pursuant to execution of instructions. For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 800. Examples of communications interfaces 805 include user interfaces (e.g., web pages), through which the user can communicate with the data processing system 110.

The output devices 810 of the computer system 800 shown in FIG. 8 may be provided, for example, to allow various information to be viewed or otherwise perceived in connection with execution of the instructions. The input device(s) 815 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The keyword generator module 130, the resource parser module 135, the frequency calculator module 140, the keyword selector module 145, and the interface provider module 150 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 800 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the keyword generator module 130, the resource parser module 135, the frequency calculator module 140, the keyword selector module 145, and the interface provider module 150 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to measuring the semantic relevance of keywords, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

The invention claimed is:

1. A method of measuring semantic relevance of keywords by parsing information resources, comprising:
  receiving, by a data processing system having one or more processors, from a content provider computing device corresponding to a domain entity having a web address, a seed keyword to generate additional keywords relevant to the seed keyword;
  accessing, by the data processing system, a semantic relationship graph including a plurality of nodes and a plurality of edges, each of the plurality of nodes referencing at least one corresponding keyword, each of the plurality of edges connecting a corresponding pair of the plurality of nodes and defining a corresponding semantic distance between a pair of at least one keywords referenced by the pair of the plurality of nodes;
  identifying, by the data processing system, using semantic relationship graph, a plurality of keyword categories including a first keyword category and a second keyword category, each of the plurality of keyword categories including a plurality of keywords, each of the plurality of keywords having a semantic distance from the seed keyword less than a semantic distance threshold as defined by a corresponding plurality of edges in the semantic relationship graph;
  retrieving, by the data processing system, an information resource of the domain entity using the web address, the information resource having primary content;
  determining, by the data processing system, for each keyword of the first keyword category and the second keyword category, a frequency of the keyword occurring with the seed keyword on the primary content of the information resource of the domain entity retrieved using the web address;
  generating, by the data processing system, for each keyword of the first keyword category and the second keyword category, a keyword-seed affinity score based on the frequency of the keyword occurring with the seed keyword on the primary content of the information resource of the domain entity identified using the web address;
  determining, by the data processing system, for the first keyword category, a first category-seed affinity score based on the keyword-seed affinity scores for each of the plurality of keywords in the first keyword category;
  determining, by the data processing system, for the second keyword category, a second category-seed affinity score based on the keyword-seed affinity scores for each of the plurality of keywords in the second keyword category;
  identifying, by the data processing system, a semantic conflict between the first keyword category and the second keyword category based on the semantic distance between at least one of the plurality of keywords in the first keyword category and at least one of the plurality of keywords in the second keyword category as defined by a corresponding edge within the semantic graph;

comparing, by the data processing system, responsive to identifying the semantic conflict between the first keyword category and the second keyword category, the first category-seed affinity score to the second category-affinity score;

determining, by the data processing system, based on the comparison, that the first category-seed affinity score is greater than the second category-seed affinity score; and transmitting, by the data processing system, to the content provider computing device for display, the plurality of keywords of the first keyword category and the plurality of keywords of the second keyword category, the plurality of keywords in the first keyword category indicated as selected responsive to determining that the first category-seed affinity score is greater than the second category-seed affinity score, the plurality of keywords in the second keyword category indicated as unselected responsive to determining that the second category-seed affinity score is less than the first category-seed affinity score.

2. The method of claim 1, further comprising:

identifying, by the data processing system, using the semantic relationship graph, the semantic conflict among the first keyword category, the second keyword category, and a third keyword category;

determining, by the data processing system, based on the semantic conflict, a first category group and a second category group, the first category group including the first keyword category, the second category group including the second keyword category and the third keyword category;

determining, by the data processing system, a first group-seed affinity score for the first category group and a second group-seed affinity score for the second category group; and comparing, by the data processing system, the first group-seed affinity score to the second group-seed affinity score; and wherein transmitting for display the plurality of keywords further comprises transmitting the plurality of keywords, the first keyword category indicated as selected and the second keyword category and the third keyword category indicated as unselected responsive to determining that the first group-seed affinity score is greater than the second group-seed affinity score.

3. The method of claim 1, further comprising:

comparing, by the data processing system, for each keyword of the first keyword category and the second keyword category, the keyword-seed affinity score to a second affinity score threshold; and identifying, by the data processing system, for each of the first keyword category and of the second keyword category, a subset of keywords each having the respective keyword-seed affinity score less than the second affinity score threshold; and wherein transmitting the plurality of keywords further comprises transmitting the plurality of keywords, the subset of keywords in the first keyword category or the second keyword category indicated as unselected responsive to identifying the subset of keywords each having the keyword-seed affinity score less than the second affinity score threshold.

4. The method of claim 1, wherein determining the first category-seed affinity score further comprises calculating a first combination score based on the keyword-seed affinity scores for each of the plurality of keywords in the first keyword category; and wherein determining the second category-seed affinity score further comprises calculating a second combination score based on the keyword-seed affinity scores for each of the plurality of keywords in the second keyword category.

5. The method of claim 1, wherein generating the keyword-seed affinity score further comprises:

parsing the information resource to identify one or more terms of the information resource and a placement of each of the one or more terms on the information resource; and determining, using the semantic relationship graph, for at least one keyword of the first keyword category and the second keyword category, a first semantic match between at least one of the one or more terms of the information resource and the respective keyword;

determining, using the semantic relationship graph, a second semantic match between at least one of the one or more terms of the information resource and the seed keyword; and calculating the keyword-seed affinity score based on the placement of the corresponding keyword on the information resource, responsive to determining the first semantic match and to determining the second semantic match.

6. The method of claim 1, wherein generating the keyword-seed affinity score further comprises:

identifying a hierarchical depth of the information resource; and adjusting, for each of the keyword-seed affinity scores of the first keyword category and the second keyword category, the keyword-seed affinity score by a preset weight based on the hierarchical depth identified for the information resource.

7. The method of claim 1, wherein generating the keyword-seed affinity score further comprises:

identifying, for each keyword of the first keyword category and the second keyword category, a normalization factor indicating average frequency of the keyword across a plurality of information resources; and adjusting, for each of the keyword-seed affinity scores of the first keyword category and the second keyword category, the keyword-seed affinity score by the normalization factor.

8. The method of claim 1, further comprising:

identifying, by the data processing system, using the semantic relationship graph, from the plurality of keywords, a first topical keyword representative of the first keyword category and a second topical keyword representative of the second keyword category, the first topical keyword having a first minimum semantic distance from each of the plurality of keywords in the first keyword category less than the semantic distance threshold, the second topical keyword having a second minimum semantic distance from each of the plurality of keywords in the second keyword category less than the semantic distance threshold; and wherein transmitting for display the plurality of keywords further comprises transmitting for display the plurality of keywords categorized into the first keyword category with the first topical keyword and the second keyword category and with the second topical keyword, responsive to identifying the first topical keyword and the second topical keyword.

9. The method of claim 1, wherein transmitting for display the plurality of keywords further comprises transmitting a script triggering the content provider computing device to display a keyword selection interface, the keyword selection interface including a first content element indicating each of the plurality of keywords of the first keyword category as selected and a second content element indicating each of the plurality of keywords of the second keyword category as unselected.

10. A system for measuring semantic relevance of keywords by parsing information resources, comprising:
a data processing system having one or more processors, configured to:
receive, from a content provider computing device corresponding to a domain entity, a seed keyword to generate additional keywords relevant to the seed keyword;
access a semantic relationship graph including a plurality of nodes and a plurality of edges, each of the plurality of nodes referencing at least one corresponding keyword, each of the plurality of edges connecting a corresponding pair of the plurality of nodes and defining a corresponding semantic distance between a pair of at least one keywords referenced by the pair of the plurality of nodes;
identify, using a semantic relationship graph, a plurality of keyword categories including a first keyword category and a second keyword category, each of the plurality of keyword categories including a plurality of keywords, each of the plurality of keywords having a semantic distance from the seed keyword less than a semantic distance threshold as defined by a corresponding plurality of edges in the semantic relationship graph;
identify an information resource of the domain entity using the web address, the information resource having primary content;
determine, for each keyword of the first keyword category and the second keyword category, a frequency of the keyword occurring with the seed keyword on the primary content of information resource of the domain entity identified using the web address;
determine, for each keyword of the first keyword category and the second keyword category, a keyword-seed affinity score based on the frequency of the keyword occurring with the seed keyword on the primary content of the information resource of the domain entity identified using the web address;
determine, for the first keyword category, a first category-seed affinity score based on the keyword-seed affinity scores for each of the plurality of keywords in the first keyword category;
determine, for the second keyword category, a second category-seed affinity score based on the keyword-seed affinity scores for each of the plurality of keywords in the second keyword category;
identify a semantic conflict between the first keyword category and the second keyword category based on a semantic distance between at least one of the plurality of keywords in the first keyword category and at least one of the plurality of keywords in the second keyword category as defined by a corresponding edge within the semantic graph;
compare, responsive to identifying the semantic conflict between the first keyword category and the second keyword category, the first category-seed affinity score to the second category-affinity score; and
determine, based on the comparison, that the first category-seed affinity score is greater than the second category-seed affinity score; and
transmit, to a content provider computing device for display, the plurality of keywords of the first keyword category and the plurality of keywords of the second keyword category, the plurality of keywords in the first keyword category indicated as selected responsive to determining that the first category-seed affinity score is greater than the second category-seed affinity score, the plurality of keywords in the second keyword category indicated as unselected responsive to determining that the second category-seed affinity score is less than the first category-seed affinity score.

11. The system of claim 10, wherein the data processing system is further configured to:
compare, for each keyword of the first keyword category and the second keyword category, the keyword-seed affinity score to a second affinity score threshold;
identify, for each of the first keyword category and of the second keyword category, a subset of keywords each having the respective keyword-seed affinity score less than the second affinity score threshold; and
transmit the plurality of keywords, the subset of keywords in the first keyword category or the second keyword category indicated as unselected responsive to identifying the subset of keywords each having the keyword-seed affinity score less than the second affinity score threshold.

12. The system of claim 10, wherein the data processing system is further configured to:
parse the information resource to identify one or more terms of the information resource and a placement of each of the one or more terms on the information resource;
determine, using the semantic relationship graph, for at least one keyword of the first keyword category and the second keyword category, a first semantic match between at least one of the one or more terms of the information resource and the respective keyword;
determine, using the semantic relationship graph, for at least one keyword of the first keyword category and the second keyword category, a first semantic match between at least one of the one or more terms of the information resource and the respective keyword; and
calculate the keyword-seed affinity score based on the placement of the corresponding keyword on the information resource, responsive to determining the first semantic match and to determining the second semantic match.

13. The system of claim 10, wherein the data processing system is further configured to identify a hierarchical depth of the information resource; and
adjust for each of the keyword-seed affinity scores of the first keyword category and the second keyword category, the keyword-seed affinity score by a preset weight based on the hierarchical depth identified for the information resource.

14. The system of claim 10, wherein the data processing system is further configured to:

identify, for each keyword of the first keyword category and the second keyword category, a normalization factor indicating average frequency of the keyword across a plurality of information resources; and adjust, for each of the keyword-seed affinity scores of the first keyword category and the second keyword category, the keyword-seed affinity score by the normalization factor.

15. A method of measuring semantic relevance of keywords by parsing information resources, comprising:

receiving, by a data processing system having one or more processors, from a content provider computing device corresponding to a domain entity having a web address, a seed keyword to generate additional keywords semantically relevant to the seed keyword;

accessing, by the data processing system, from a database, a semantic relationship graph including a plurality of nodes representing keywords and a plurality of edges, each of the plurality of edges connecting two respective nodes of the plurality of nodes and defining a semantic distance between the two keywords representing the two respective nodes, at least one of the plurality of edges indicating that the two keywords represented by the respective nodes of the plurality nodes as semantically conflicting;

traversing, by the data processing system, the plurality of nodes of the semantic relationship graph to identify a seed node representing the seed keyword and for each of the candidate nodes adjacent to the seed node a semantic distance between the seed keyword and the keyword of the adjacent node as defined by a corresponding plurality of edges in the semantic relationship graph;

identifying, by the data processing system, a set of candidate nodes from the plurality of nodes adjacent to the seed node having a respective edge with a respective semantic distance between a seed node-candidate node pair of less than a semantic distance threshold;

retrieving, by the data processing system, a plurality of information resources of the domain entity using the web address, each information resource of the plurality of information resources having primary content;

parsing, by the data processing system, for each candidate keyword of the set of candidate nodes, the plurality of information resources to determine a frequency at which the seed keyword and the candidate keyword occur across the primary content of the plurality of the information resources retrieved using the web address of the domain name;

identifying, by the data processing system, from the candidate keywords of the set of candidate nodes, a first set of keywords corresponding to a first subset of the set of candidate nodes and a second set of keywords corresponding to a second subset of the set of candidate nodes;

identifying, by the data processing system, a semantic conflict between at least one of a first set of candidate keywords and at least one of a second set of candidate keywords based on the respective edge of the semantic relationship graph indicating two corresponding keywords as semantically conflicting;

comparing, by the data processing system, a first frequency of at least one of the first set of candidate keywords to a second frequency of at least one of the second set of candidate keywords, responsive to identifying the semantic conflict; and transmitting, by the data processing system, to the content provider computing device, instructions to display at the content provider computing device, the first set of keywords as selected as relevant and the second set of keywords as unselected as irrelevant based on the comparison.

16. The method of claim 15, further comprising:

computing, by the data processing system, for each candidate keyword of the set of candidate keyword, a normalization factor based on a frequency at which the respective keyword occurs in a general corpus different from the plurality of information resources;

adjusting, by the data processing system, for each candidate keyword of the set of candidate keyword, the frequency by the normalization factor for the respective keyword.

17. The method of claim 15, further comprising:

identifying, by the data processing system, for each keyword of the set of candidate nodes, using a clustering algorithm, one of a first keyword category and a second keyword category based on the semantic distances among each keyword of the set of candidate nodes; and identifying, by the data processing system, the first keyword category as selected and the second keyword category as unselected based on the corresponding frequency of each keyword and the frequency threshold.

* * * * *